United States Patent
Ikedo et al.

(10) Patent No.: US 6,757,223 B1
(45) Date of Patent: Jun. 29, 2004

(54) SYSTEM FOR CARRYING AND REPRODUCING A DISC

(75) Inventors: Yuji Ikedo, Saitama-ken (JP); Yoshimitsu Fukushima, Saitama-ken (JP); Hitoshi Nagata, Saitama-ken (JP); Atsushi Yamane, Saitama-ken (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 09/197,495

(22) Filed: Nov. 23, 1998

(30) Foreign Application Priority Data

Nov. 27, 1997 (JP) .............................................. 9-326100
Dec. 10, 1997 (JP) .............................................. 9-340146

(51) Int. Cl.[7] .......................................... G11B 17/24
(52) U.S. Cl. ...................................................... 369/37
(58) Field of Search .............................. 369/37, 30.64, 369/30.76, 30.85, 30.86, 30.88, 30.01, 36.01, 792, 30.5, 30.56, 30.79, 30.8, 30.91

(56) References Cited

U.S. PATENT DOCUMENTS

| 4,750,160 | A | * | 6/1988 | Miller et al. ................... 369/37 |
|---|---|---|---|---|
| 4,791,626 | A | * | 12/1988 | Staar ........................... 369/37 |
| 4,815,057 | A | * | 3/1989 | Miller et al. ................... 369/37 |
| 4,984,228 | A | * | 1/1991 | Agostini ........................ 369/37 |
| 5,067,116 | A | * | 11/1991 | Kadrmas ........................ 369/37 |
| 5,187,695 | A | * | 2/1993 | Schindler et al. .............. 369/37 |
| 5,235,579 | A | * | 8/1993 | Ross ........................ 369/30.56 |
| 5,307,331 | A | * | 4/1994 | d'Arc ........................... 369/37 |
| 5,528,566 | A | * | 6/1996 | McGee et al. ................. 369/37 |
| 5,587,988 | A | * | 12/1996 | Boulanger ................... 369/178 |
| 5,644,558 | A | * | 7/1997 | Inatani et al. ................. 369/30 |
| 5,943,306 | A | * | 8/1999 | Silverstein .................... 369/37 |

FOREIGN PATENT DOCUMENTS

| DE | 41 21 297 A1 | 1/1992 |
|---|---|---|
| EP | 0 519 069 A1 | 12/1992 |
| EP | 0 680 042 A2 | 11/1995 |

* cited by examiner

Primary Examiner—William Korzuch
Assistant Examiner—Angel Castro
(74) Attorney, Agent, or Firm—Arent Fox PLLC

(57) ABSTRACT

An annular disc holder has a plurality of partition plates for holding a plurality of discs in an upright position, and a reproducing device is provided for reproducing a desired disc. A carrying device is provided for carrying the desired disc between the disc holder and the reproducing device. The partition plates are radially arranged. The carrying means is provided for returning the desired disc to the disc holder from a large width portion between the partition plates.

4 Claims, 25 Drawing Sheets

FIG. 22a  FIG. 22b  FIG. 22c
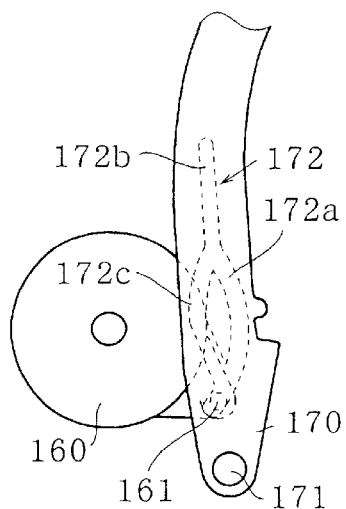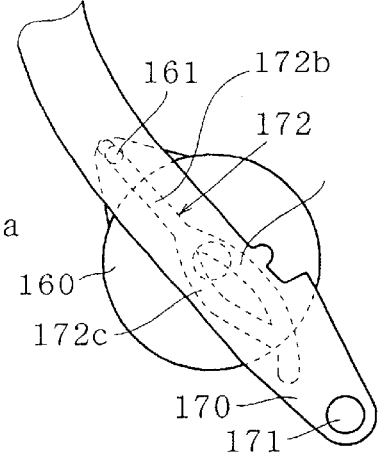
FIG. 22d
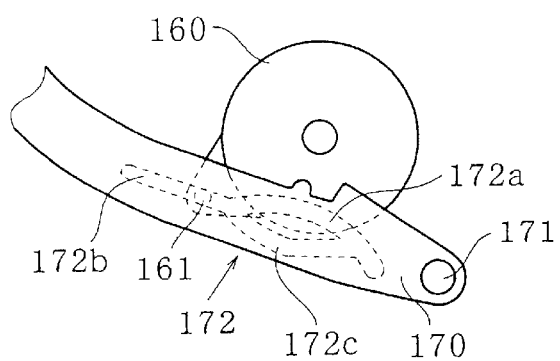
FIG. 22e
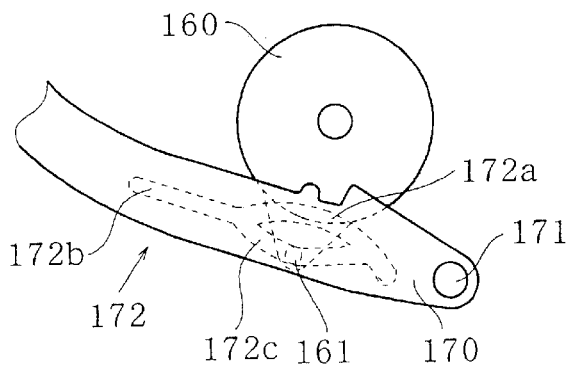

US 6,757,223 B1

SYSTEM FOR CARRYING AND REPRODUCING A DISC

BACKGROUND OF THE INVENTION

The present invention relates to a system for reproducing a disc.

A disc reproducing system having an automatic disc changer has recently become popular. The disc reproducing system is provided with a rack wherein a large number of CDs are stored so as to improve the storing efficiency of the CDs.

FIG. 24 is a perspective view of such a reproducing system disclosed in Japanese Patent Laid Open 9-223351 which has been filed by the present patent applicant.

FIGS. 25 and 26 show another reproducing system disclosed in Japanese Patent Laid Open 59-104759.

The system of FIG. 24 will be described firstly. A disc reproducing system is provided with a roulette device 3 mounted on a chassis base 2 in a housing. The housing comprises the chassis base 2, casing 8, rear panel 9 and the front operation panel 10. The roulette device 3 comprises a base 3a, rack base 3b having a spindle 3c and a center pole 5 mounted on the spindle 3c, and five rotary circular racks 4a, 4b, 4c, 4d and 4e, each having a center hole 4 in which the center pole 5 is engaged. Hence, all of the racks 4a to 4e are securely mounted on the center pole 5 in a tiered formation.

In each of the racks 4a to 4e, there is formed radial slits 40 in each of which a recording medium D such as CD can be stored. A radial recess 41 through which a disc player 7 provided adjacent the racks 4a to 4e passes is further formed in each of the racks 4a to 4e at a predetermined circumferential position. In the player 7, an arm 7a is provided for taking out one of recording mediums D. The arm 7a is operated by a driving device (not shown) upon loading and ejecting of the recording mediums D into and out of the disc player 7 thereby passing through one of the slits 40 of the rack from the underneath thereof.

The front operation panel 10 is provided with an opening 10a through which the recording mediums D is inserted and taken out. The opening 10a is covered by a door 6 having a pin 6a projected downward from the top. The pin 6a engaged with the upper end of the center pole 5 so that the door 6 is rotatably mounted thereon. The door 6 is rotated on the pole 5 in the counterclockwise direction to disclose the racks 4a to 4e through the opening 10a.

On the underside of the rack 4a, an encoder (not shown) and photo sensors are provided for detecting position of a desired recording mediums on one of the racks 4a to 4e.

When a select button on the operation panel 10 is operated to select a desired recording mediums, the racks 4a to 4e are rotated and stored at an angular position where the desired recording medium is stored. The disc player 7 is vertically moved to the position of one of racks where the recording medium is stored. The arm 7a takes out the recording medium and loads it on the disc player 7, thereby reproducing the recording medium.

Referring to FIGS. 25 and 26, an annular storing base 12 is rotatably provided in a frame 11 and rotated by a rotating device 13. On the storing base 12, a plurality of recording mediums D are stored. An information reading and writing device 15 and an arm driving device 17 for driving an arm 16 are mounted on a holding base 14. A guide 15a is provided for guiding the recording medium D. An opening 18 is formed for inserting the recording medium D. The arm 16 has pawls 16a and is driven by a screw 19.

When a desired recording medium D is selected, the storing base 12 is rotated so that the selected recording medium is positioned at the opening 18 of the information reading and writing device 15. Then, the arm 16 is moved in the direction X by the arm driving device 17, and inserts the recording medium D into the device 15. The recording medium D is located at a position d shown by dotted lines. At the position, the information is read and written.

Thereafter, the information reading and writing device 15 moves the recording medium D to a position where a part of recording medium D is projected from the opening 18.

A detector (not shown) mounted on the arm 16 detects whether the recording medium D contacts with the arm 16 or not. If contacts, the pawls 16a are moved in the direction Y in FIG. 27 by solenoids (not shown) to grip the recording medium D. If does not contact, the arm 16 is moved in the direction X until contacts. Then, the arm 16 is moved in the direction X' so that the recording medium D is returned to the storing base 12, and hence the sequential operation is completed.

In the former reproducing system, in order to increase the storing quantity of the recording medium D on the racks 4a to 4e, the number of the racks must be increased, or the diameter of each rack must be increased. However either of the methods increases the system in size which renders the manufacturing cost to be increased.

In addition, when the arm 7a of the player 7 loads and unloads the recording medium D, the arm 7a may slide on the adjacent recording medium D, which causes the recording surface of the medium to be damaged.

In the case of the increasing of storing density of the medium, the problem of damaging adjacent medium D further increases.

In the latter reproducing system, in order to increase the storing quantity of the recording medium D, the diameter of the storing base 12 must be increased. However, such an improvement increases the system in size, which accompanies by increasing of the manufacturing cost.

Furthermore, when the arm 16 of the arm driving device 17 inserts a medium D in the opening 18, the arm 16 slides on the adjacent medium D, thereby damaging the recording surface of the adjacent disc D.

In addition, in the system, the pawls 16a grip the disc, when returning. However, there is a problem that the pawls may damage recording surfaces of the returned disc and on adjacent disc.

SUMMARY OF THE INVENTION

An object of the present invention is to provide a system for reproducing recording mediums which may exactly carry a desired recording medium to a disc storing means.

Another object of the present invention is to provide a recording medium reproducing system which is improved to increase the storing efficiency without increasing the size of the system.

According to the present invention, there is provided a system for reproducing a disc comprising, a disc holder having a plurality of partition plates for holding a plurality of discs in an upright position, a reproducing device for reproducing a desired disc, carrying means for carrying the desired disc between the disc holder and the reproducing device, wherein the partition plates are arranged in non-parallel, so that the space between opposite partition plates has a large width portion and a small width portion, and the carrying means is provided for returning the desired the disc to disc holder from the large width portion.

The partition plates are annularly arranged so that the partition plates are radially arranged.

The reproducing device is disposed in a central portion in the annularly arranged partition plates.

In another aspect of the present invention, the carrying means has a guide portion inserted in a space between discs at opposite sides of the desired disc during the operation of the system.

These and other objects and features of the present invention will become more apparent from the following detailed description with reference to the accompanying drawings.

BRIEF DESCRIPTION OF DRAWINGS

FIGS. 22a to 22e are side views showing operation of a base portion of the carrying device;

DETAILED DESCRIPTION OF THE PREFERRED EMBODIMENT

The first embodiment of the present invention will be described with reference to FIGS. 1 to 6.

Figure 2:
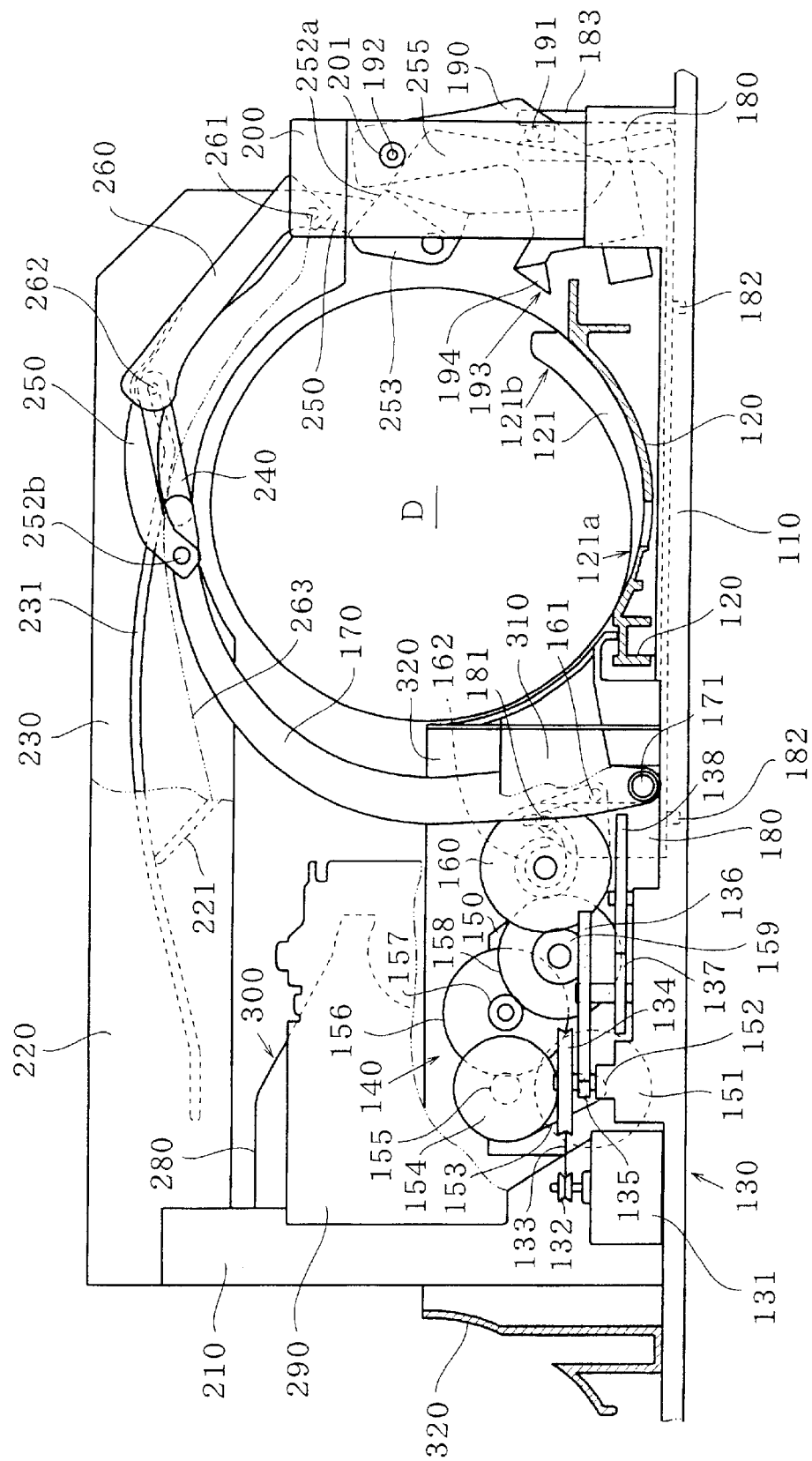
FIG. 2 is a cross section showing a part of the device.
Figure 4:
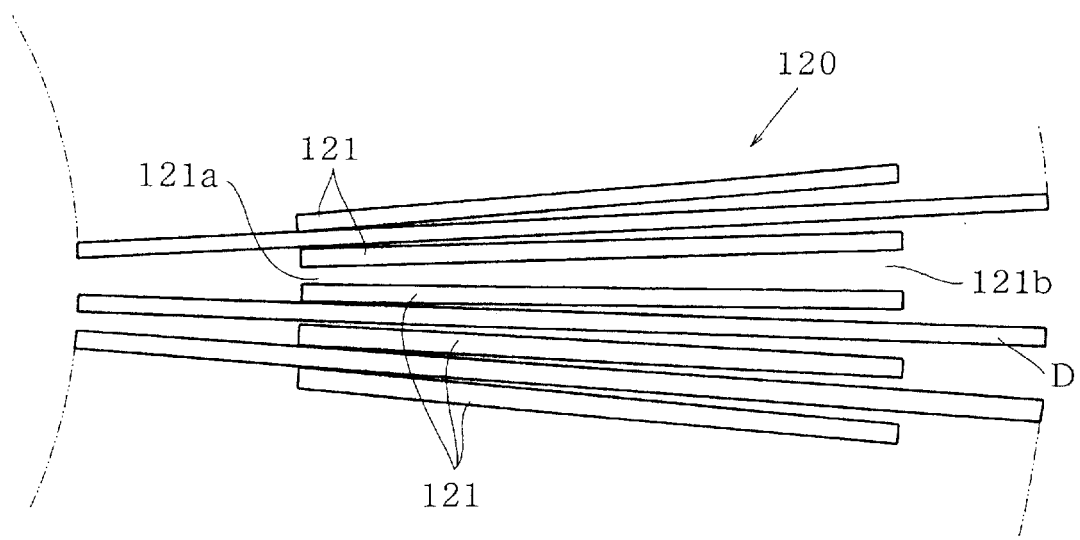
FIG. 4 is an enlarged plan view of a part of FIG. 3 indicated by IV.

An annular disc holder 120 is rotatably mounted on a rack base 110 in a housing 100. The disc holder 120 is provided with an information recording medium (hereinafter called disc) storing portion, which has a plurality of radially (in non-parallel), arranged partition plates 121 for storing discs. As shown in FIG. 2, the partition plate has the lowest height at the inner end and has the highest height at the outer end. As shown in FIG. 4, the storing space between the partition plates has the smallest width 121a at the inner end and the largest width 121b at the outer end. The smallest width 121a has a value for receiving and holding the disc D in an upright position.

Figure 3:
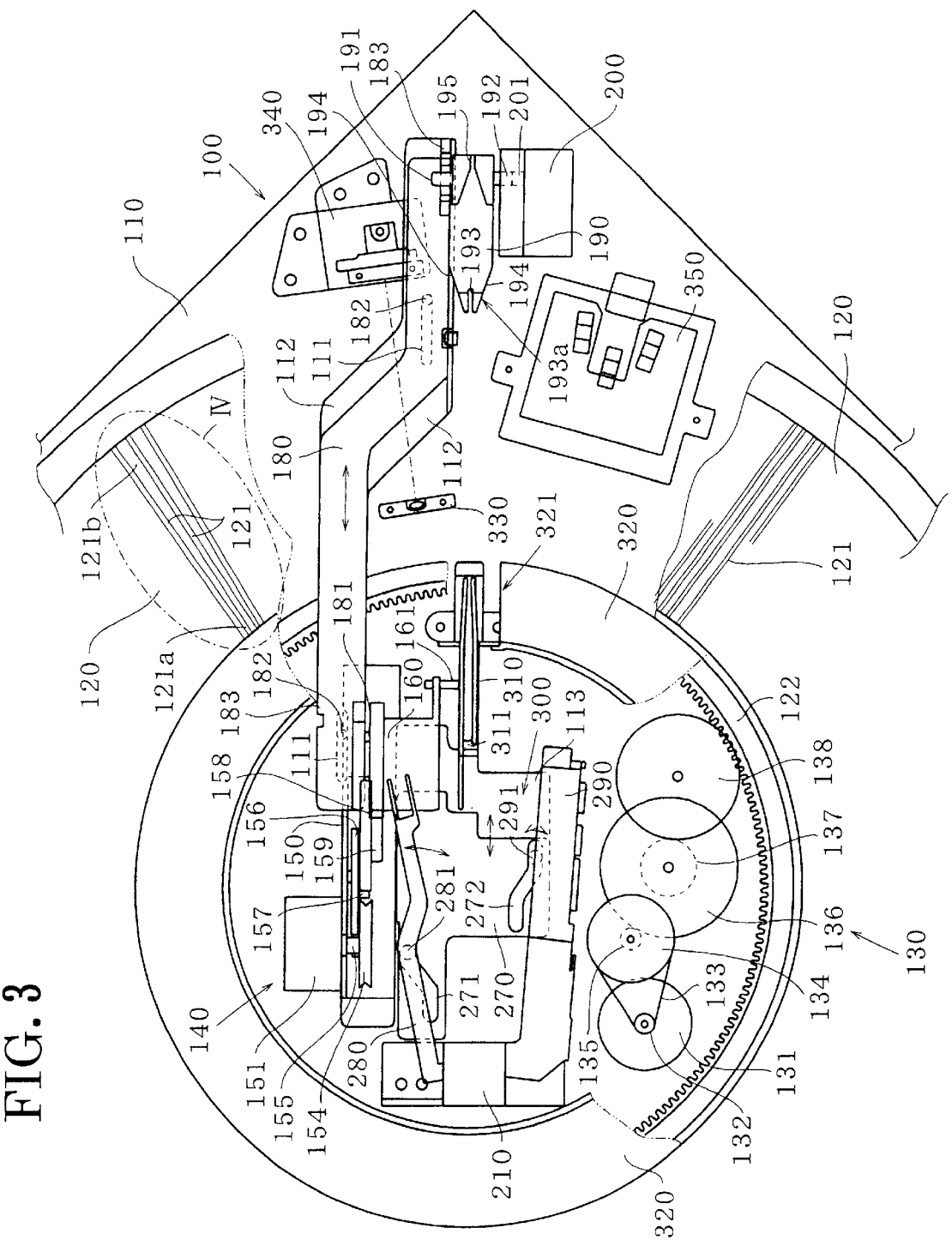
FIG. 3 is a plan view showing a part of the device.

As shown in FIGS. 2 and 3, a rack driving device 130 is provided on the rack base at a central portion of the rack holder 120. The rack driving device 130 has a driving motor 131. Securely mounted on an output shaft of the motor 131 is a pulley 132 which is connected to a pulley 134 by a V-belt 133. A pinion 135 coaxial with pulley 134 engages with a reduction gear 136 rotatably mounted on the rack base 110. A pinion 137 on the shaft of the gear 136 engages with a driving gear 138 rotatably mounted on the rack base 110. The driving gear 138 engages with a rack 122 formed on an inner periphery of the disc holder 120.

A gear driving device 140 having a disc loading is provided on a central portion of the disc holder 120, as a loading device of the disc D. A disc reproducing device 300 having a loading motor 151 is provided adjacent the gear driving device 140, as a driving source of a driving arm 170. A pulley 152 on the shaft of the loading motor 151 is connected to a pulley 154 held on a gear holder 150 by a V-belt 153. A pinion 155 on the shaft of the pulley 154 is engaged with a reduction gear 156, and a pinion 157 coaxial with the gear 156 is engaged with a reduction gear 158. A pinion 169 coaxial with the gear 158 meshes with a circular driving cam 160.

A pin 161 provided on a side of the cam 160 is engaged with a cam groove 172 (FIG. 22) provided on a base portion of the arm 170 rotatably mounted by a shaft 171 so as to rotate the arm 170. A cam groove 162 formed on the other side of the cam 160 is engaged with a guide pin 181 provided on a slide plate 180 so as to reciprocate the slide plate 180.

As shown in FIG. 3, the slide plate 180 is mounted on the rack base 110 underside of the disc holder 120. A pair of guide pins 182 projected from the underside of the slide plate 180 are slidably engaged with guide grooves 111, so that the slide plate 180 is slid in a groove 112.

On the other side of the slide plate 180, a vertical recess 183 is formed for controlling a pressure plate 190. On the one of the sides, a guide pin 191 is provided to be engaged with the recess 183.

A guide pin 192 mounted on the pressure plate 190 and projected in the opposite direction to the guide pin 191 is engaged in a hole 201 of a holding base 200 (hereinafter described). When the slide plate is reciprocated, the pressure plate 190 is rotated about the guide pin 192.

A V-shaped end 193a (FIG. 3) is formed on the pressure plate 190, and a gripping groove 193 is formed for gripping a desired disc D, and inclined side faces 194 are also formed so that the side faces 194 are inserted into the gaps between the desired disc D and adjacent discs D', thereby increasing the gap in the circumferential direction of the disc holder 120.

In addition, the pressure plate 190 has a guide groove 195 in which a guide portion 255 (FIG. 5) of a carrier arm 250 is adapted to be engaged.

On the other hand, a clamp post 210 is mounted on a central position of the disc holder 120, and the pusher plate holding base 200 (FIG. 2) is mounted on the rack base 110 outside the disc holder 120. Mounted on upper portions of the clamp post 210 and of the holding base 200, is a pair of guides 220 (L) and 230 (R) over the disc holder 120 (FIG. 2).

Figure 1:
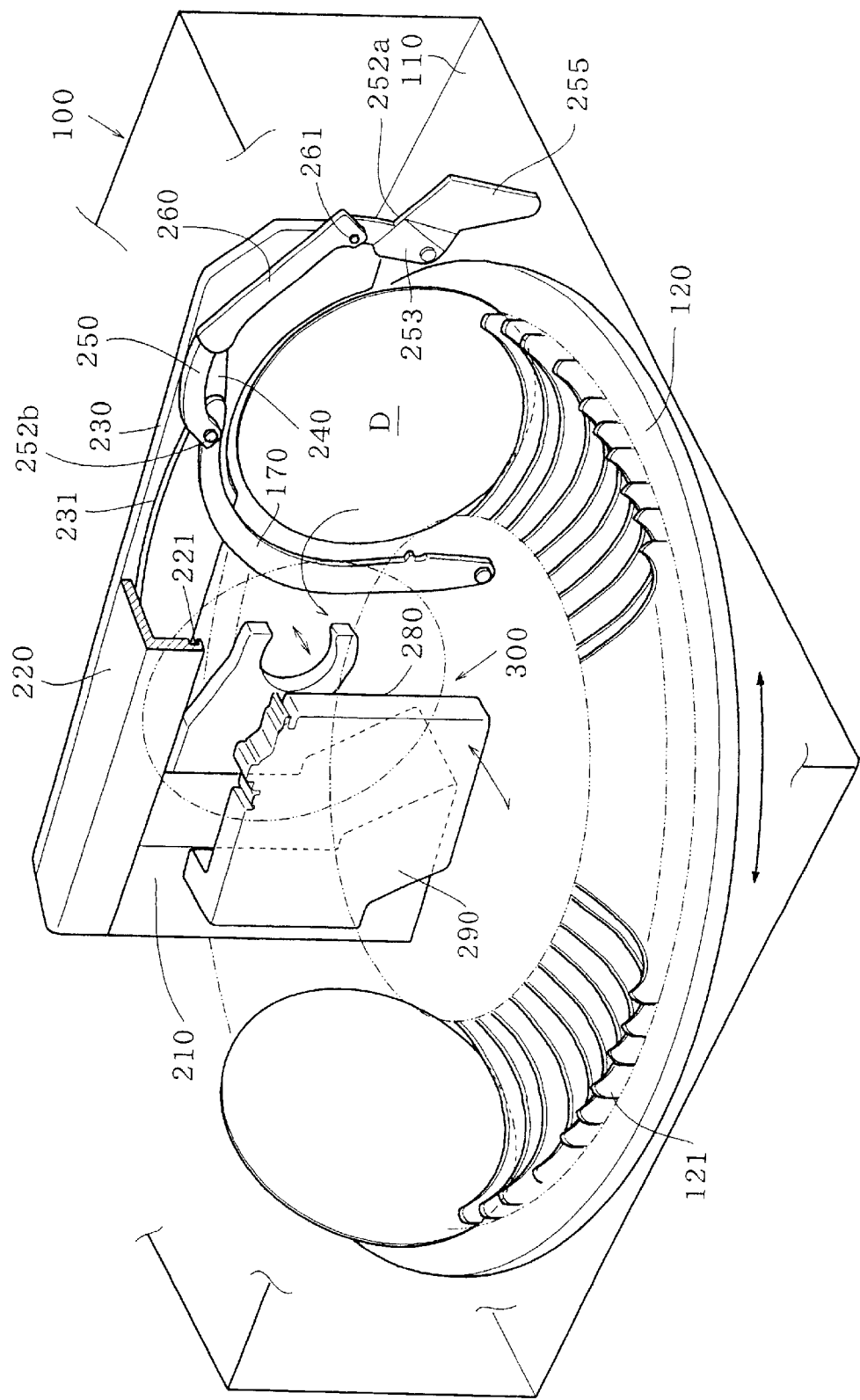
FIG. 1 is a perspective view of a reproducing device to which the present invention is applied, as a first embodiment.
Figure 5:
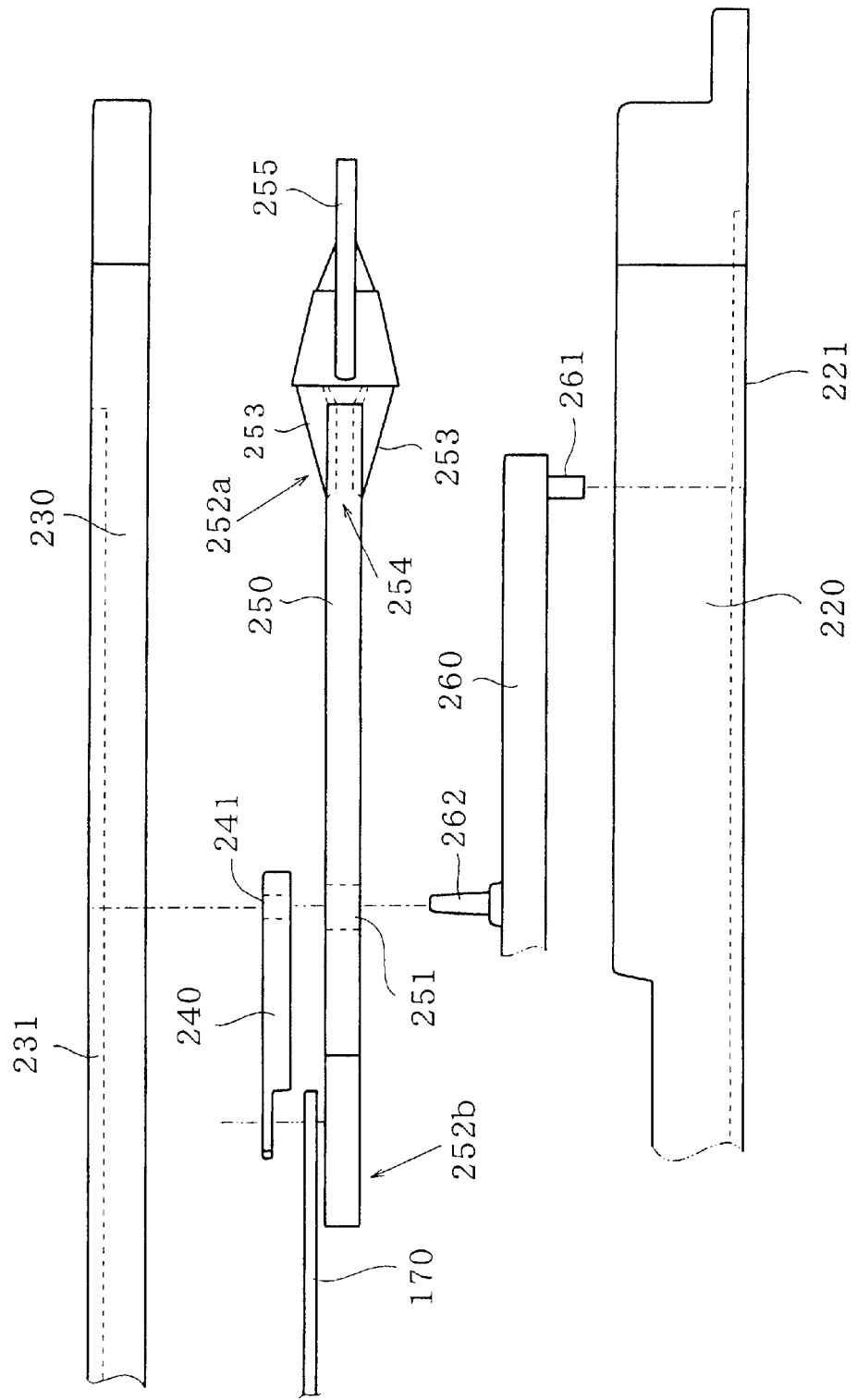
FIG. 5 is a plan view showing a carrying device.

As shown in FIGS. 1 and 5, the guide 220 has a guide groove 221 at the inside wall thereof. In the guide groove 221, a guide pin 261 of a guide arm 260 is slidably engaged. A guide groove 231 is formed on the guide 230 opposite to the guide groove 221.

On the other hand, the guide arm 260 has a guide pin 262 which passes through a hole 251 of a carry arm 250 and a hole 241 of an intermediate arm 240, and is slidably engaged with the guide groove 231. The intermediate arm 240 is connected to an end of the driving arm 170.

Figure 8:
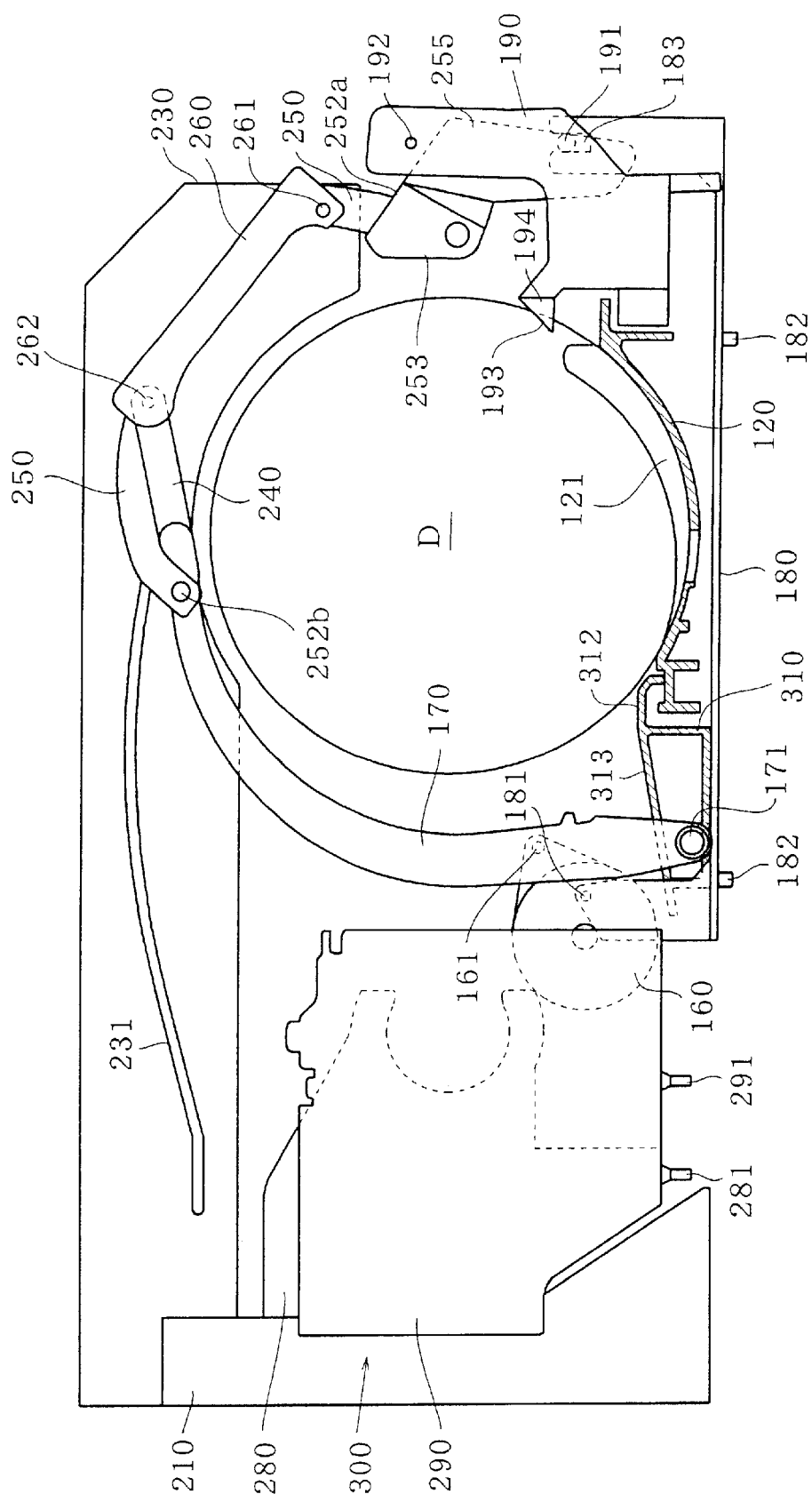

The carry arm 250 has engaging portions 252a and 252b at both ends thereof. The engaging portion 252a has inclined side faces 253 which slidably engage only with the peripheral edges of the adjacent discs D' adjacent to the desired disc and a groove 254 slidably engaged with the peripheral edge of the desired disc D. (FIGS. 2, 5, 8)

The engaging portions 252a and 252b of the carry arm 250 hold the disc D, and takes it out from the disc holder, and carry it to the disc reproducing device 300.

On the end of the carry arm 250, the guide portion 255 is provided for positioning the disc. The guide portion 255 is shaped into a thin flat plate (FIGS. 4 and 5). Before the disc D is carried to the reproducing device 300, the guide portion 255 is inserted in the guide groove 195 of the pressure plate 190 (FIG. 3). As a result, the carry arm 250 is exactly positioned. Therefore, the engaging portions 252a and 252b are accurately engaged with the disc D on the disc holder 120.

Figure 6:
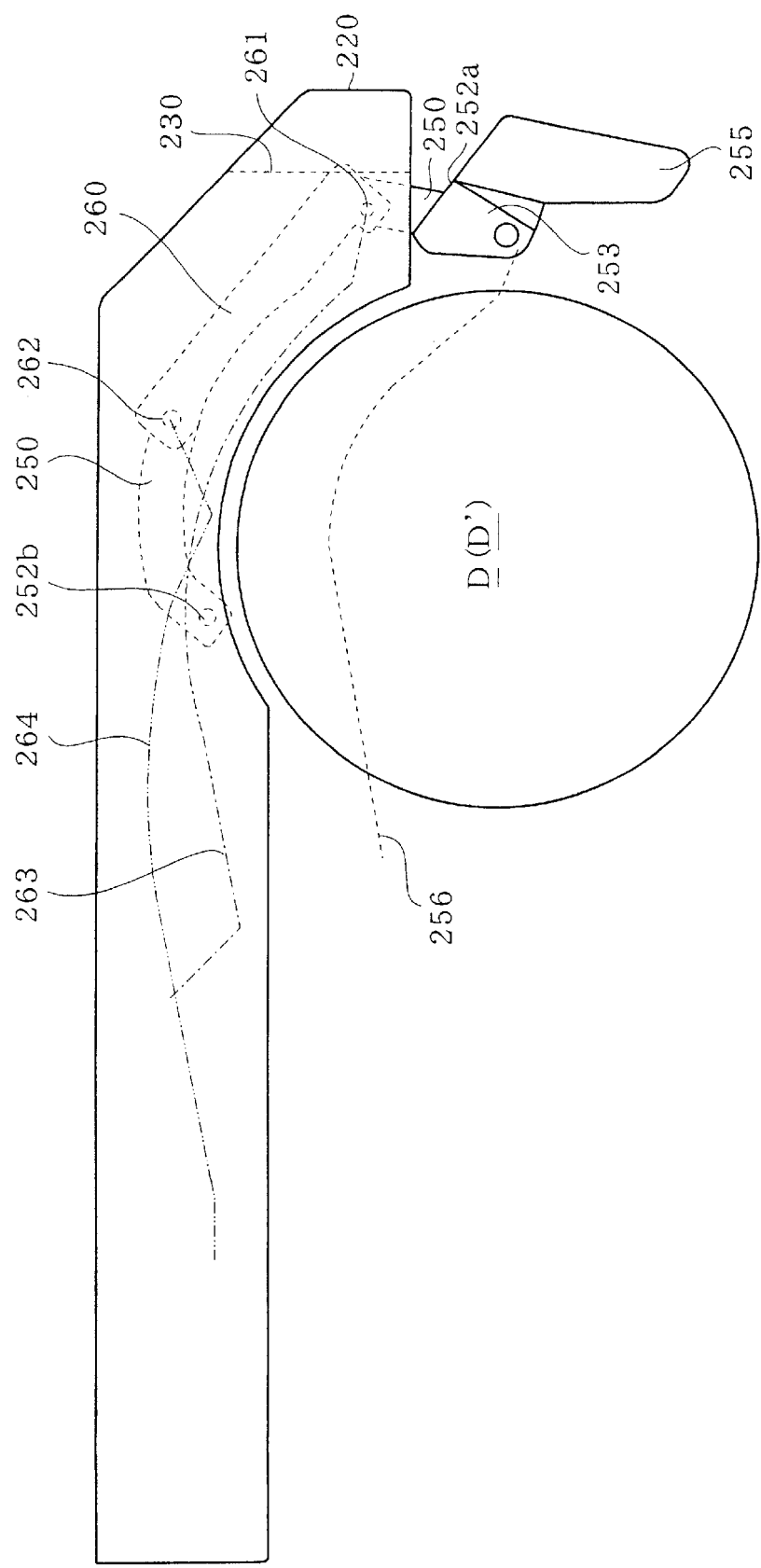
FIG. 6 is a side view of the carrying device.

Referring to FIG. 6, a dot-dash line 263 indicates a passage when the guide pin 261 at the end of the arm 260 is moved along the guide groove 221 (FIG. 1). A dot-dash line 264 indicates a passage when the pin 262 is moved along the guide groove 231 (FIG. 7) of the guide 230. A dotted line 256 shows a passage of the engaging portion 252a of the arm 250 when the arm 260 is moved along the guide grooves 221 and 231 of the guides 220 and 230. The passage 256 is shaped so as to move along a peripheral portion of each of the adjacent discs D.

As shown in FIG. 3, a driving cam 270 is slidably engaged with a groove 113 of the rack base 110 at a central portion of the disc holder 120 so as to be reciprocated in the groove 113. The driving cam 270 is driven by the motor 151.

On the driving cam 270, a pair of guide grooves 271 and 272 are formed for operating a damper holder 280 and a servo device 290 of reproducing device 300.

Guide pins 281 and 291 provided underside of the damper holder 280 and servo device 290 which are pivotally mounted on the damper post 210 are slidably engaged with the guide grooves 271 and 272 of the cam 270. Thus, the clamper holder 280 and servo device 290 are swayed when the cam 270 is reciprocated. On the servo device 290, a pickup, spindle motor and others are mounted.

Furthermore, on the rack base 110, a disc guide 310 and an annular cover 320 are provided. The cover 320 has a recess 321 engaged with the disc guide 310.

Figure 7:
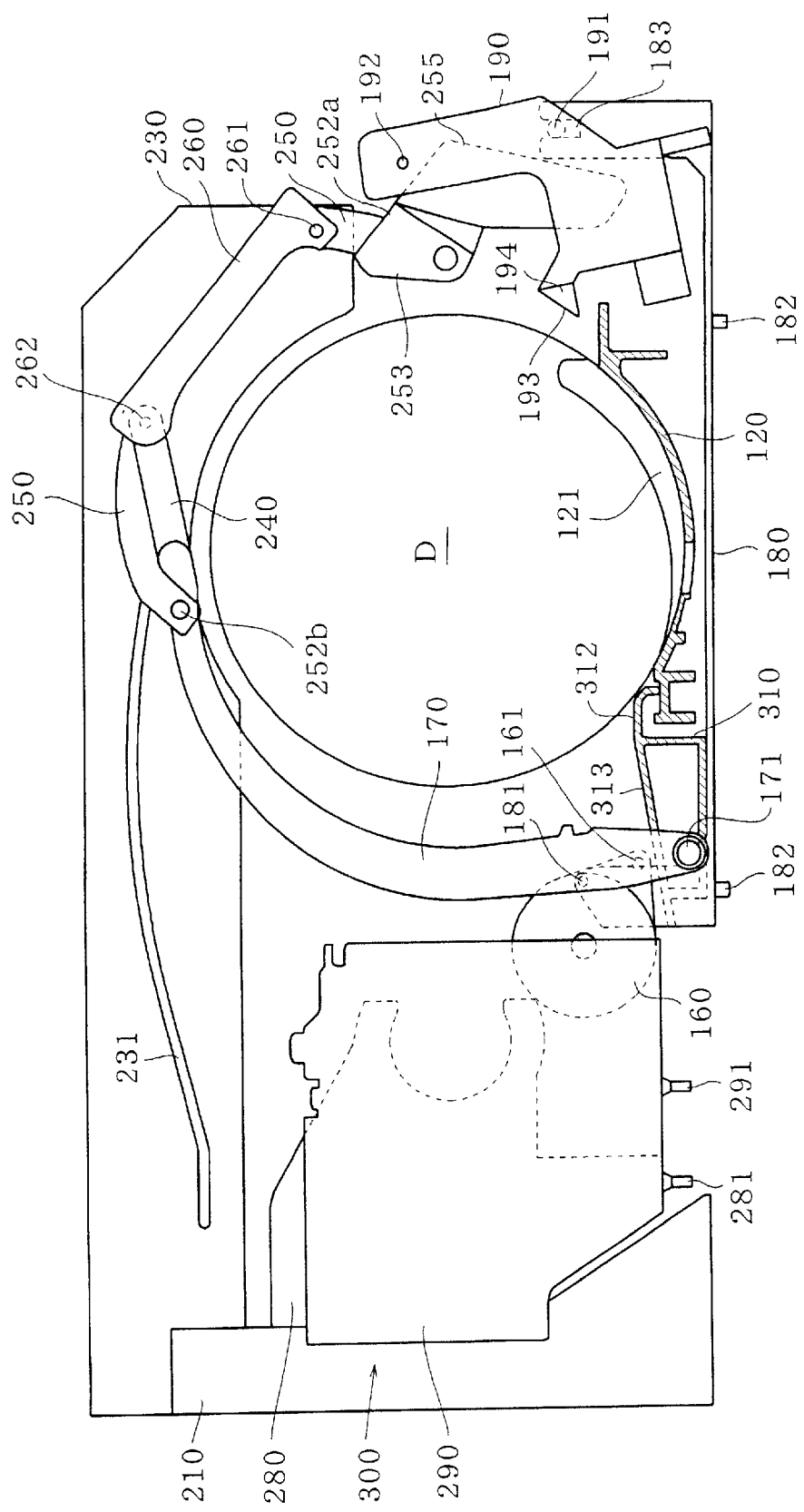
FIGS. 7 to 21 are side views showing operation of the carrying device.

The disc guide 310 is provided for guiding the disc D. To this end, the disc guide 310 has a groove 311, a bottom 312 of which is adapted to be engaged with the disc D (FIG. 7). Adjacent the bottom 312, an inclined portion 313 is formed.

Referring to FIG. 3, a sensor holder 330 and a sensor stay 340 are oppositely mounted on the base 110 so as to optically detect the disc D. Further, a sensor 350 is provided for detecting the address of the disc holder 120.

The operation of the device will be described hereinafter with reference to FIGS. 2 to 23.

FIG. 7 shows an unloading state of the disc D where the driving arm 170 and the guide arm 260 are located at right end positions. Furthermore, the slide plate 180 is also located at a right end position.

When selection of a desired disc is instructed from an operating panel (not-shown), the motor 131 (FIG. 3) is operated to rotate the rack 122 through the gear train comprising gears 134, 135, 136, 137 and 138, thereby rotating the disc holder 120. When the address detecting sensor 350 detects that the desired disc D is located at the front position of the reproducing device 300, the disc holder 120 is stopped. Then the motor 151 (FIG. 3) is operated to drive the gear driving section 140, so that the driving cam 160 is rotated in the counterclockwise direction. The rotation of the driving cam 160 causes the slide plate 180 to slide to the left by engagement of the pin 181 of the slide plate 180 with the cam groove 162 of the cam 160. Accordingly, the pin 191 engaged with the recess 183 of the slide plate 180 is moved to the left, so that the pressure plate 190 is rotated in the clockwise direction about the pin 192.

Figure 20:
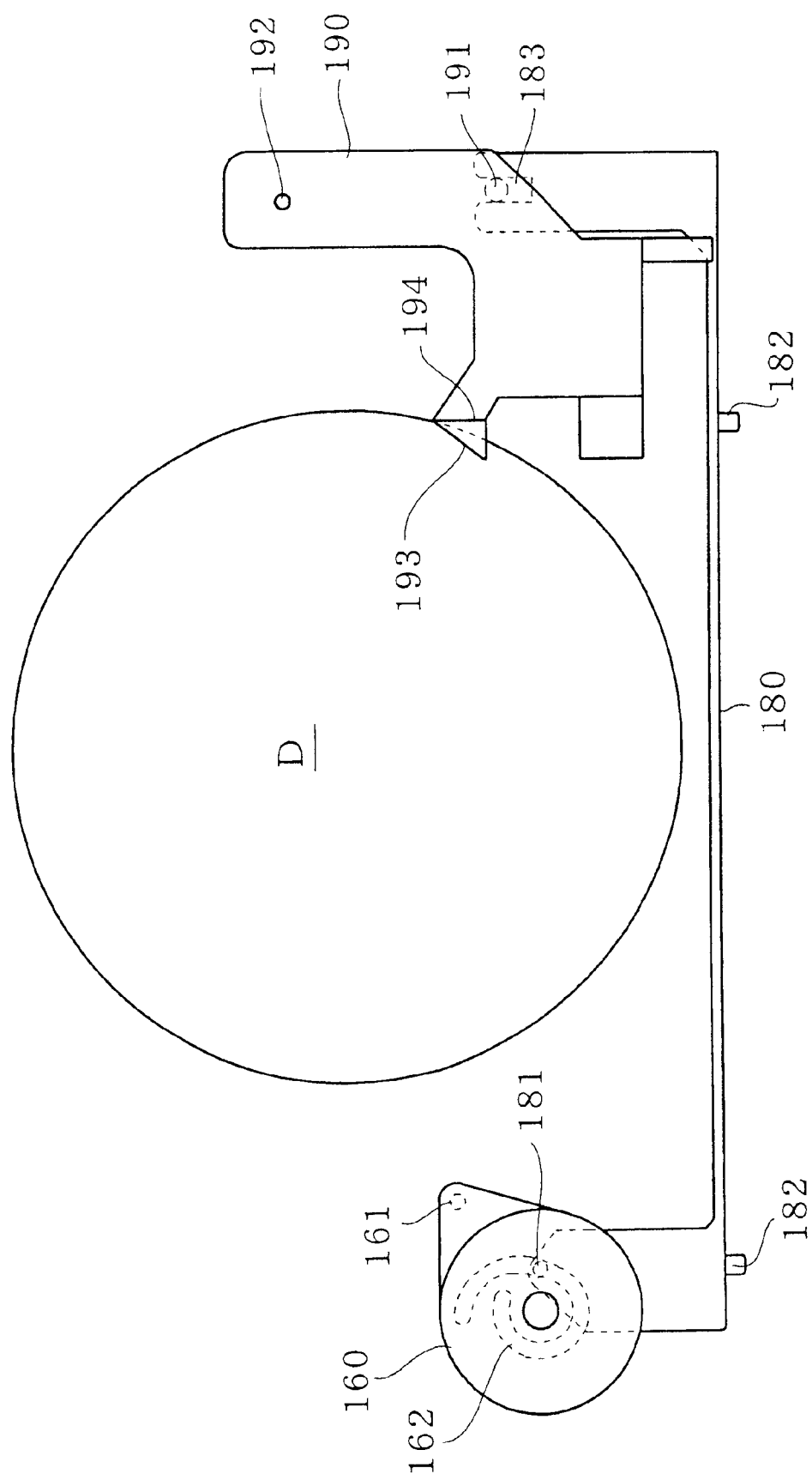

As shown in FIG. 20, the groove 193 of the push plate 190 is engaged with a peripheral portion of the desired disc D, and the inclined side faces 194 engage with discs D' at both sides of the desired disc D to push the discs D'. Thus, the spaces between the disc D and both side discs D' are expanded.

At that time, a part of the push plate 190 engages with a part of the disc holder 120 to securely hold the disc holder to prevent the disc holder 120 from vibrating during the operation.

Figure 21:
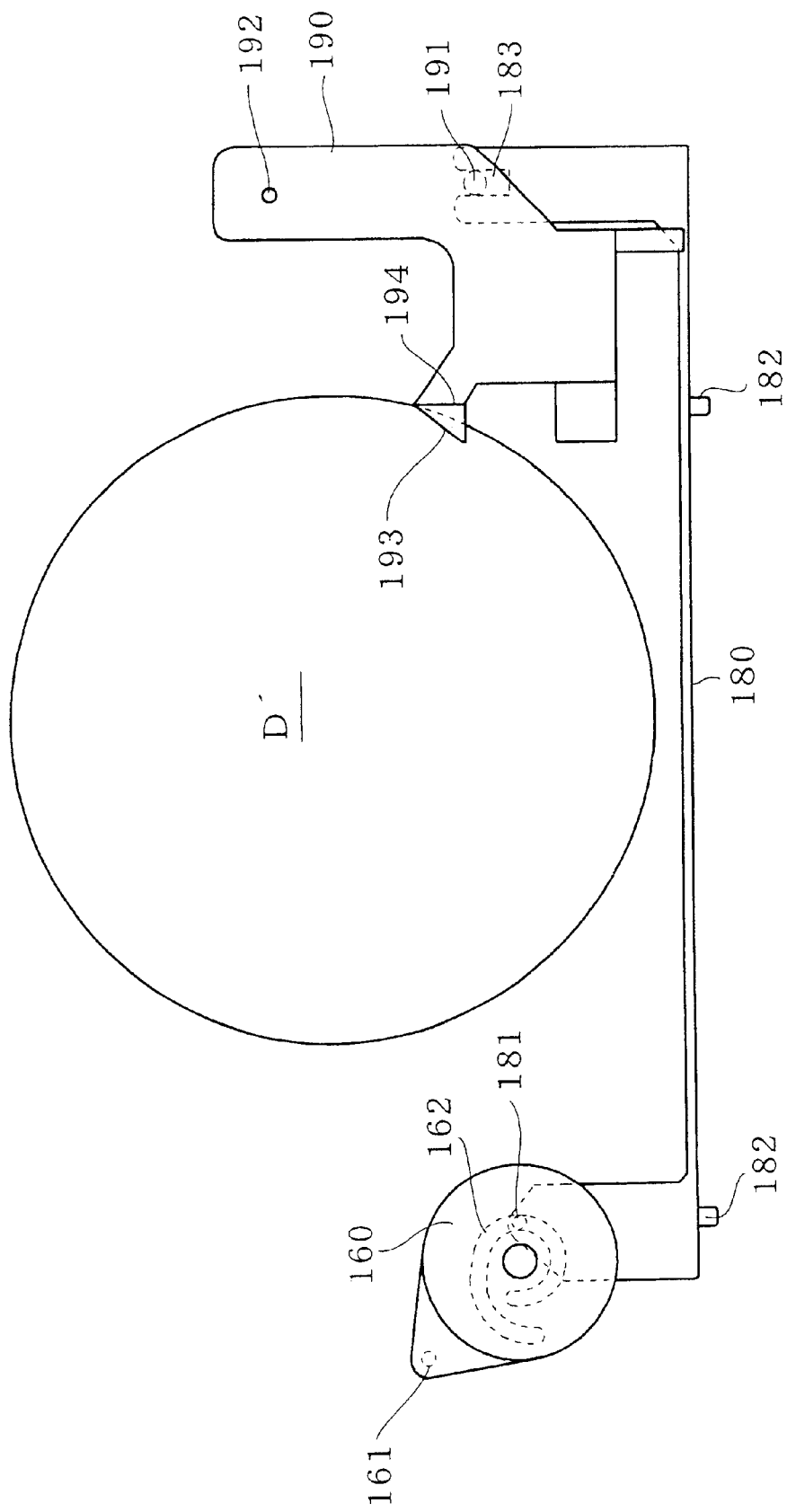
Figure 23:
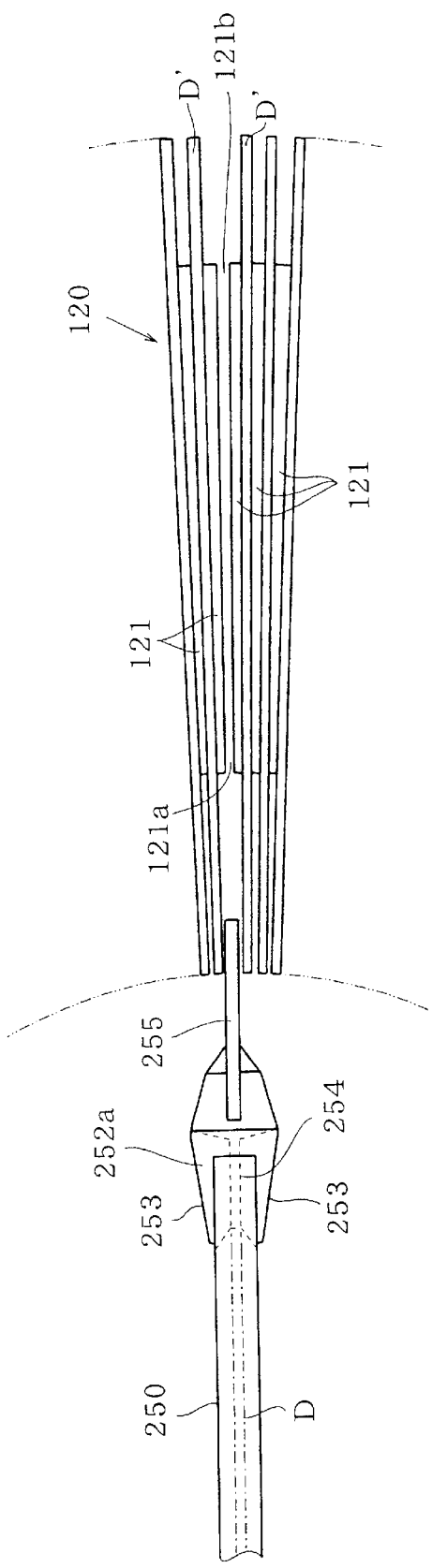
FIG. 23 is a plan view for explaining operation to return a disc.
Figure 24:
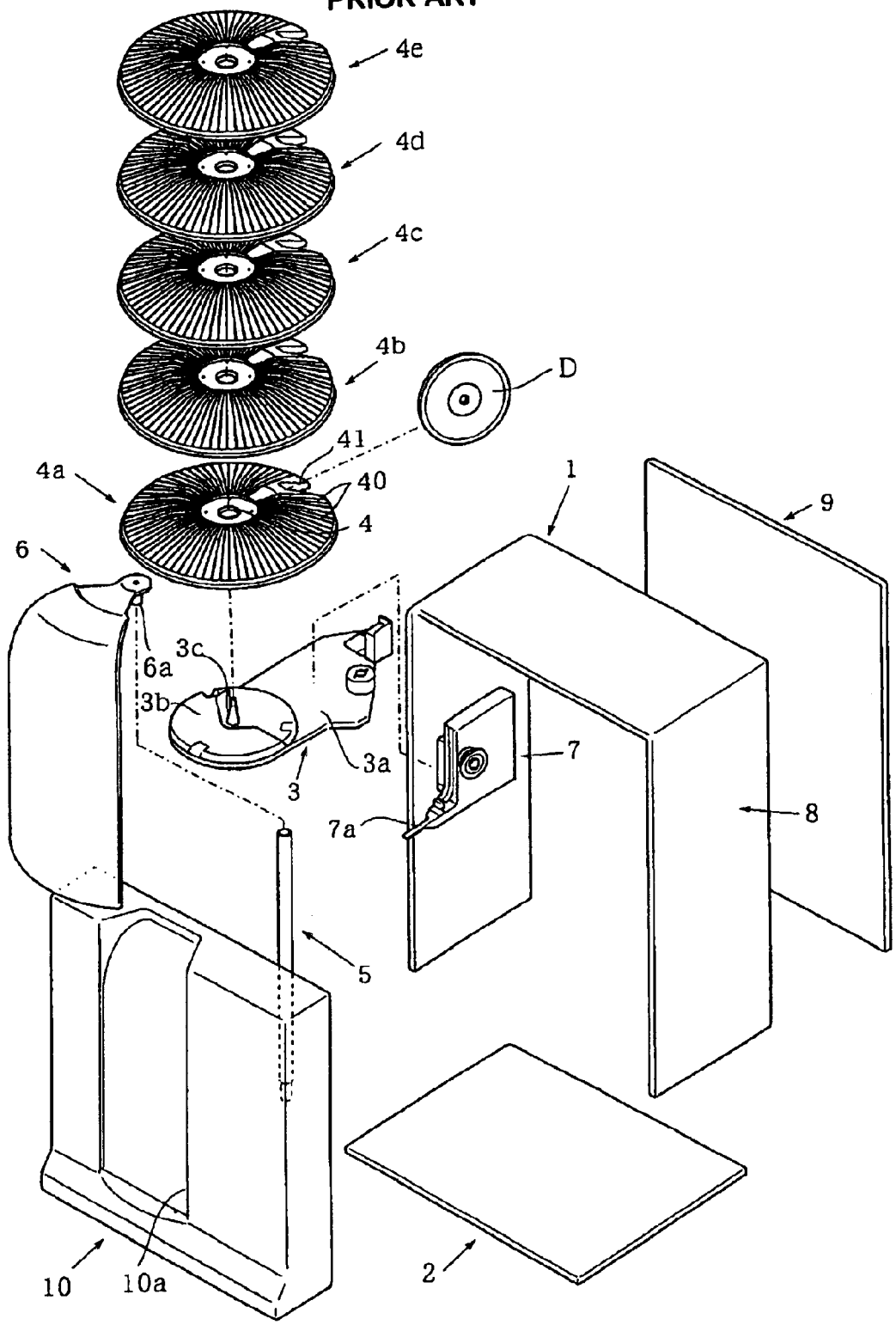
FIG. 24 is a perspective view showing a conventional device.
Figure 25:
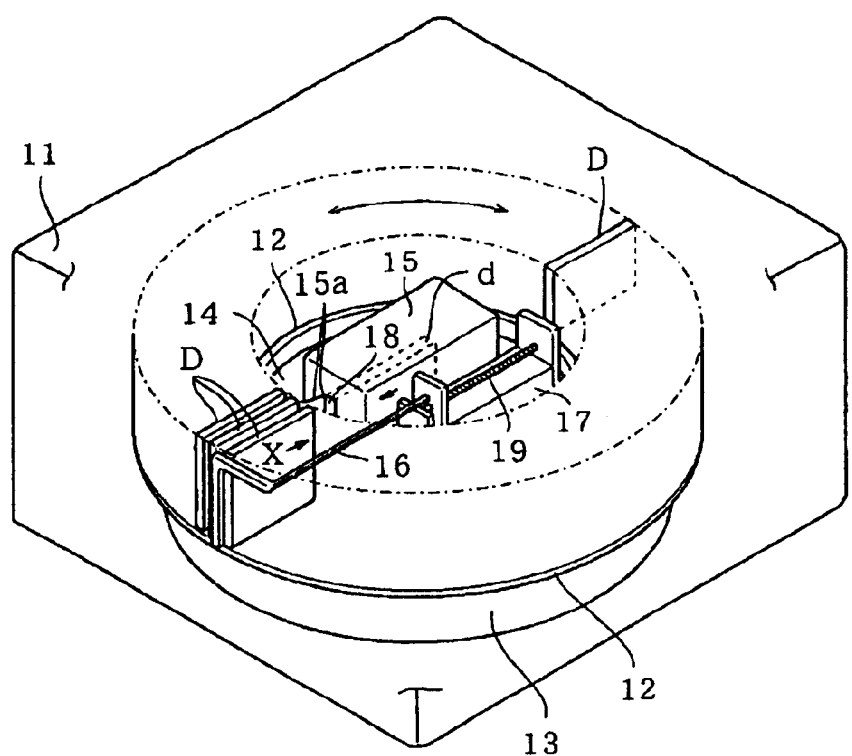
FIG. 25 is a perspective view of another conventional device.
Figure 26:
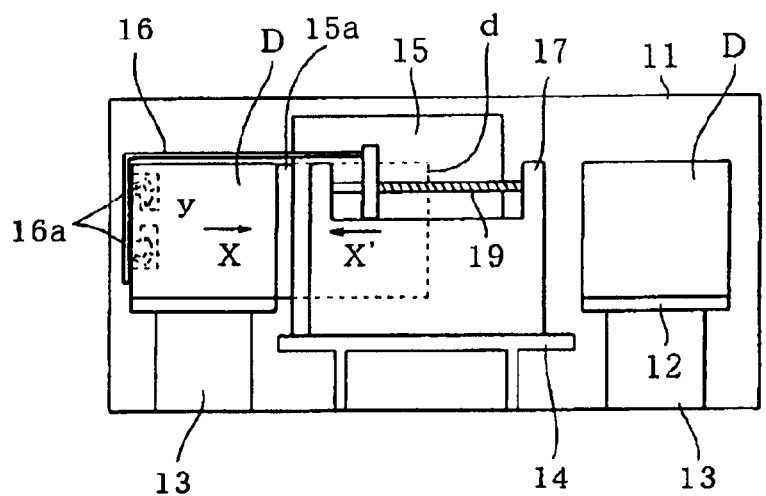
FIG. 26 is a sectional view of the device of FIG. 25.

In such a condition, the slide plate 180 is kept at the position of FIG. 21 due to the shape of the cam groove 162.

During the above described operation the cam 160 rotates from the position of FIG. 22a to the position FIG. 22b. However, since a part 172a of the cam groove 172 has a circular shape of the same circle as the circle on which the pin 161 on the cam 160 moves, the arm 170 does not rotate.

When the cam 160 further rotates, the pin 161 enters a straight portion 172b as shown in FIG. 22c. Therefore, the arm 170 starts to rotate about the shaft 171 in the counter-clockwise direction as shown is FIGS. 9 and 22c.

The rotating arm 170 actuates the guide 260 and the carry arm 250 through the intermediate arm 240. Namely, the pin 261 of the arm 260 moves along the guide groove 221 of the guide 220, and the pin 262 of the arm 260 moves along the guide groove 231 of the guide 230.

Figure 9:
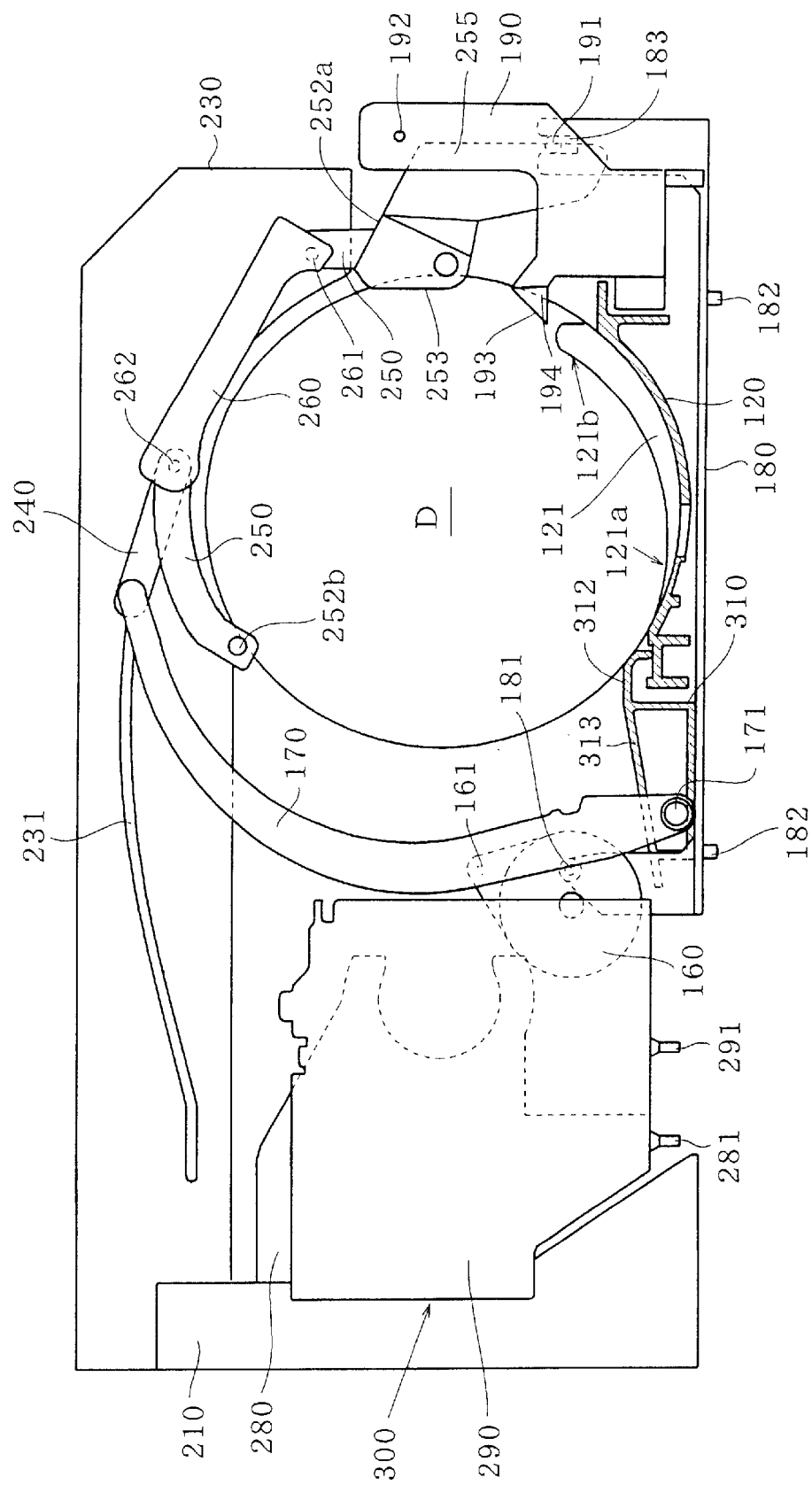
Figure 10:
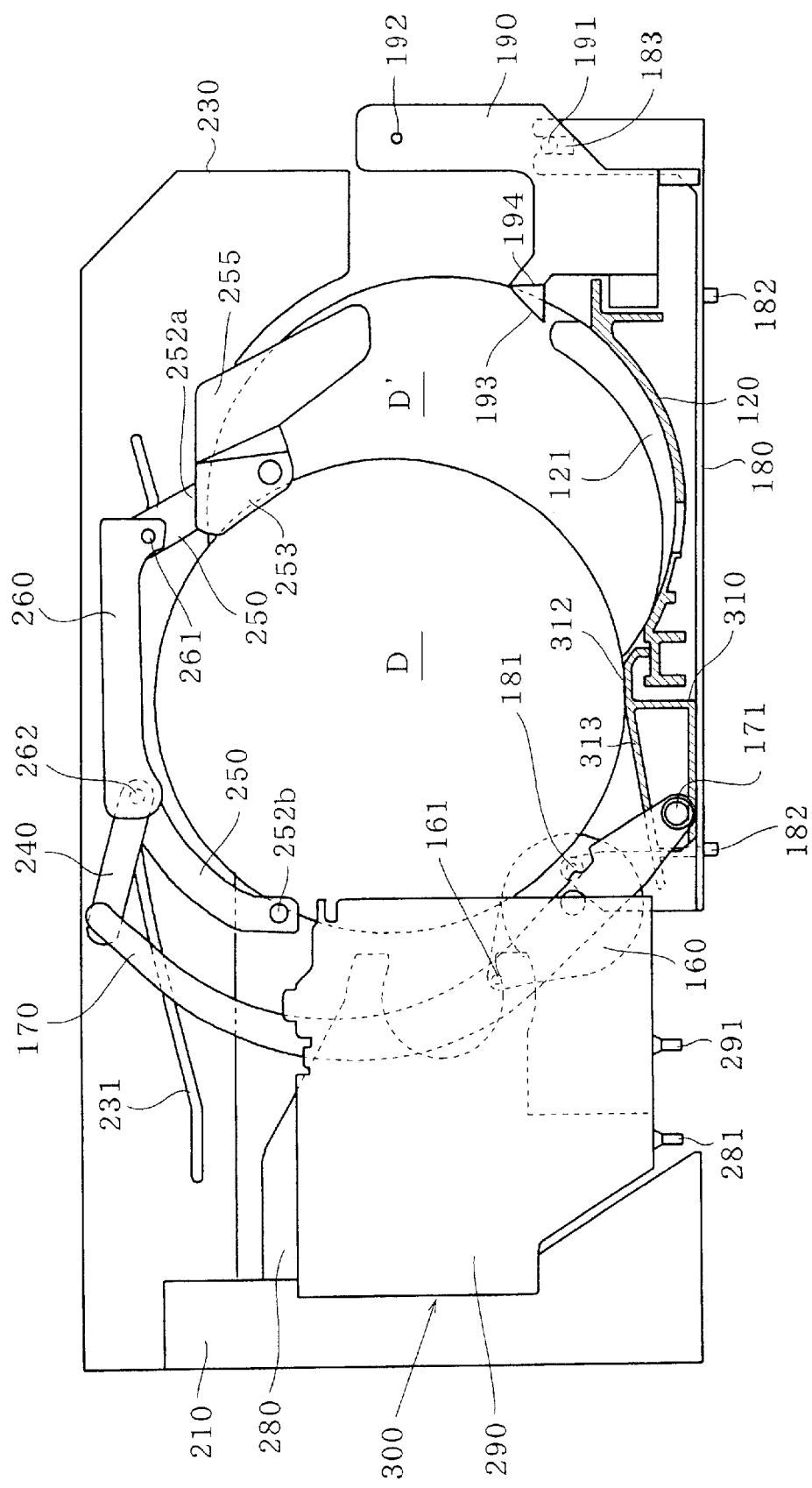
Figure 11:
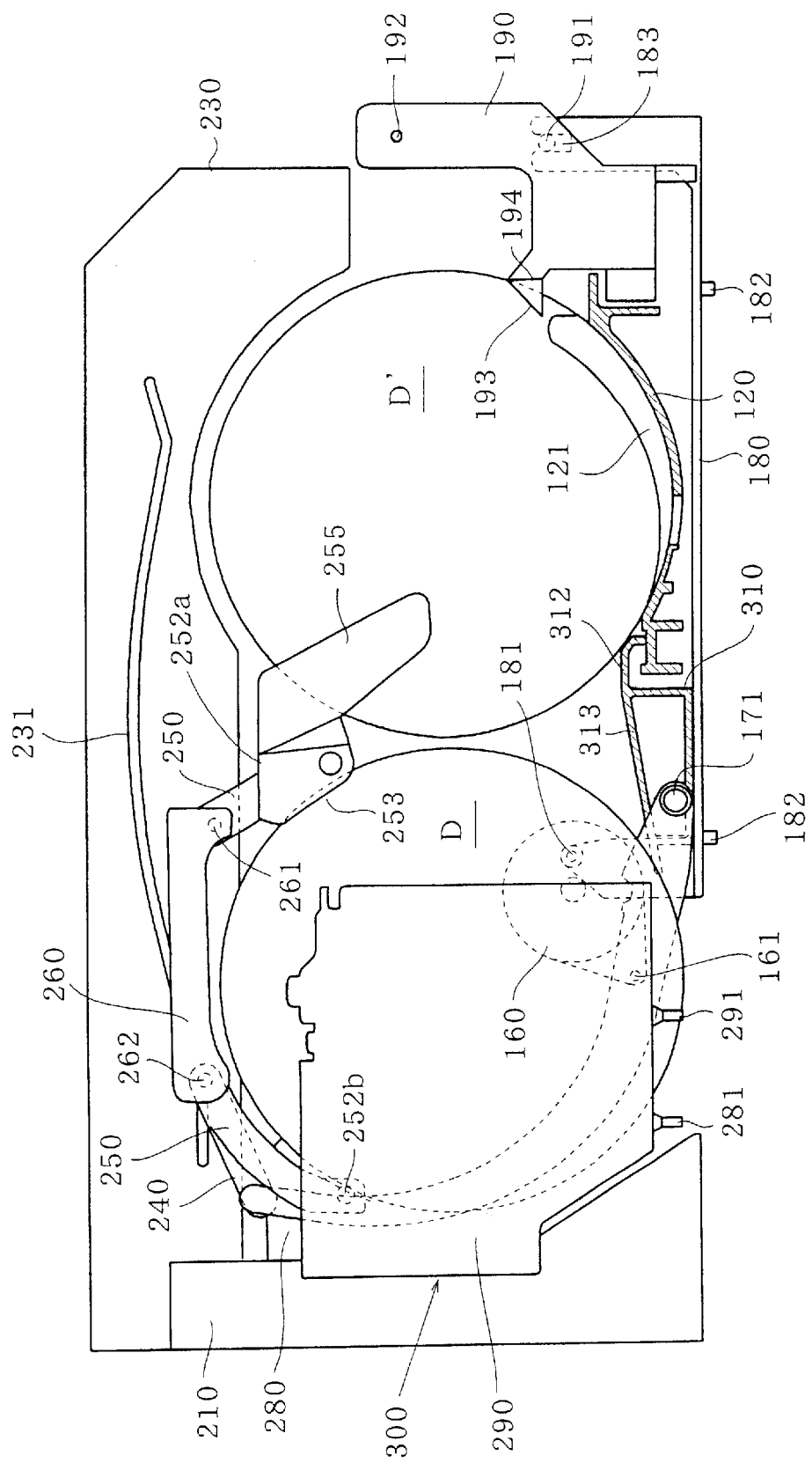

In the condition that discs D' on the both sides of the desired disc D are spaced from the disc D, the guide portion 255 of the arm 250 enters the guide groove 195 of the push plate 190. Therefore, ensurely, the groove 254 of the engaging portions 252a and 252b of the carrying arm 250 are slidably engaged with the, peripheral portion of the desired disc D as shown in FIG. 9. The inclined portions 253 of the arm 250 are inserted in the spaces between the discs D and D' to further expand the space there-between. Further the disc D is removed from the disc holder 120 as shown in FIG. 10. The disc D is inserted in the groove 311 (FIG. 3), rolling the disc D on the bottom 312 and the inclined portion 313. Thus, the disc D is loaded on the reproducing device 300 as shown in FIG. 11.

Figure 12:
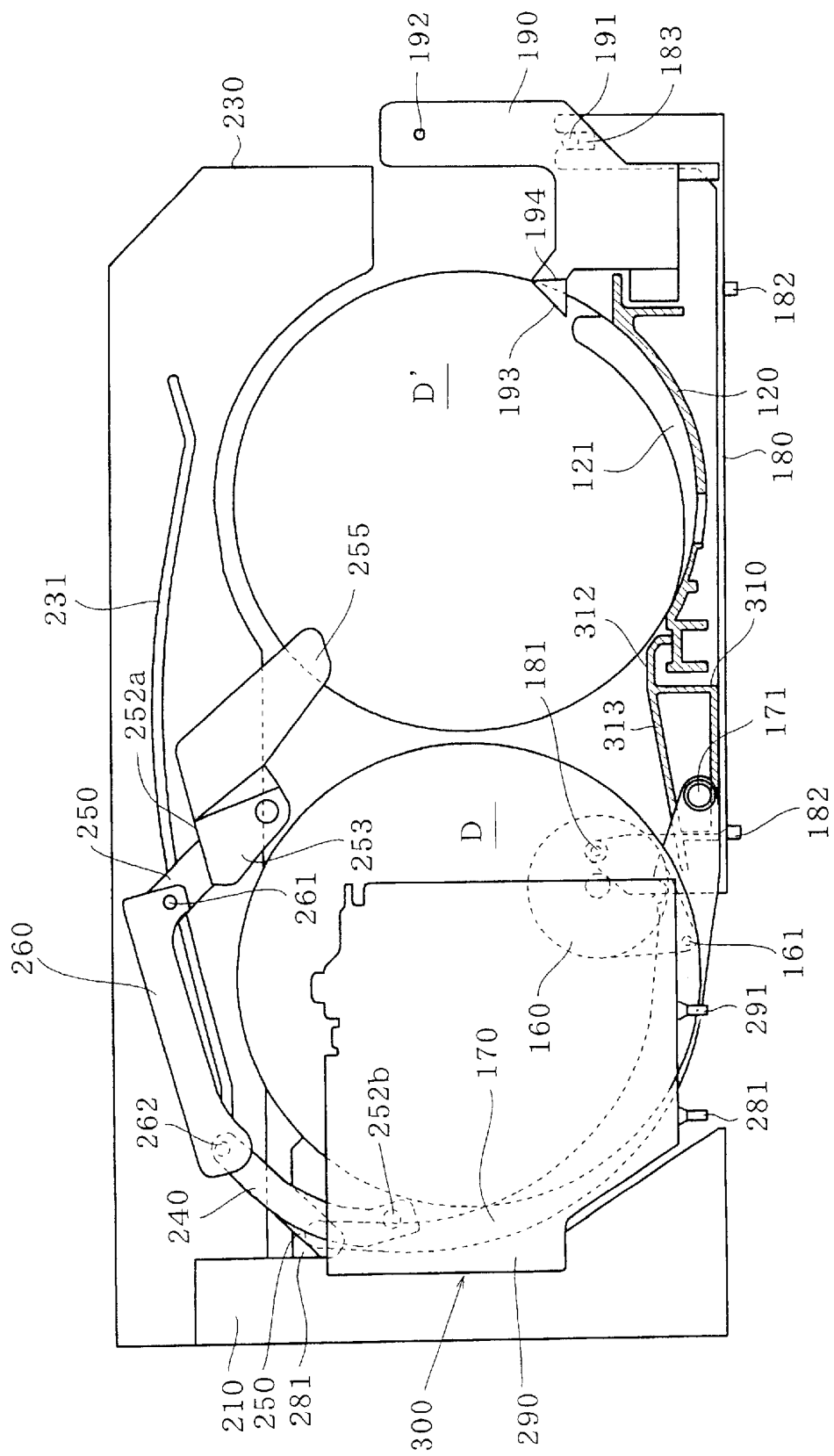
Figure 13:
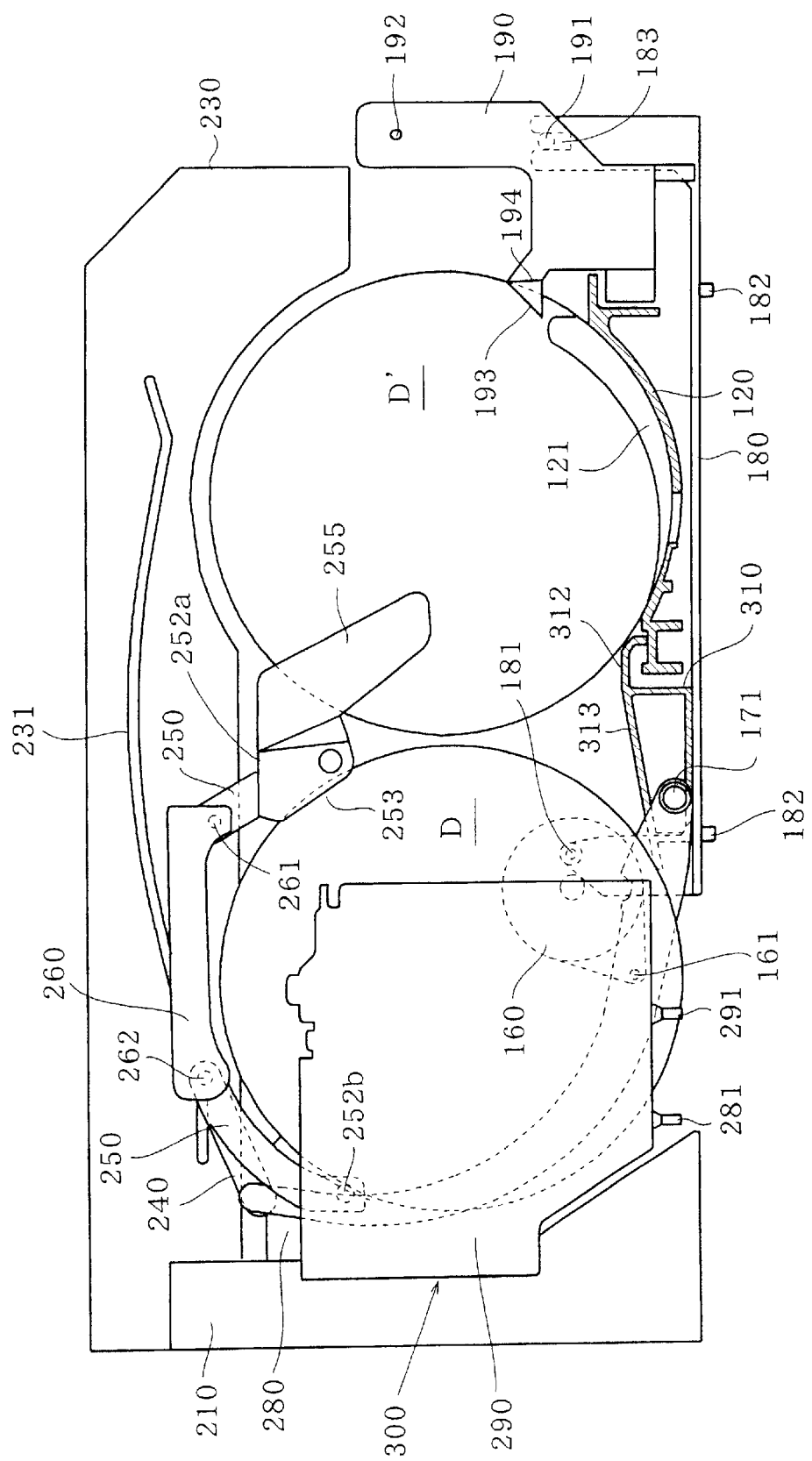

At that time, the pin 161 is still engaged with the straight portion 172b as shown in FIG. 22d. The pin 161 is further rotated in a groove 172c (FIG. 22e) to move the arm 170. Thus, as shown in FIG. 12, the engaging portions 252a and 252b of the carrying arm 250 are removed from disc D. On the other hand, the guide portion 255 is still inserted between the discs D'.

At the same time, the cam 160 moves the cam 270 to the right in FIG. 3 so that the pin 281 of the clamper holder 280 and the pin 291 of the servo device 290 are moved by cam grooves 271 and 272, thereby clamping the disc D carried by the carrying arm 250. Thus, the disc D is reproduced by the reproducing device 300.

In order to return the disc D to the disc holder 120, the above described operation is reversely performed as shown in FIGS. 12 to 18. The operation is described hereinafter.

When the returning of the disc D is demanded, the loading motor 151 is reversely operated. The cam 270 is moved to the left in FIG. 3, so that the clamper holder 280 and the servo device 290 are removed from the disc D.

Figure 14:
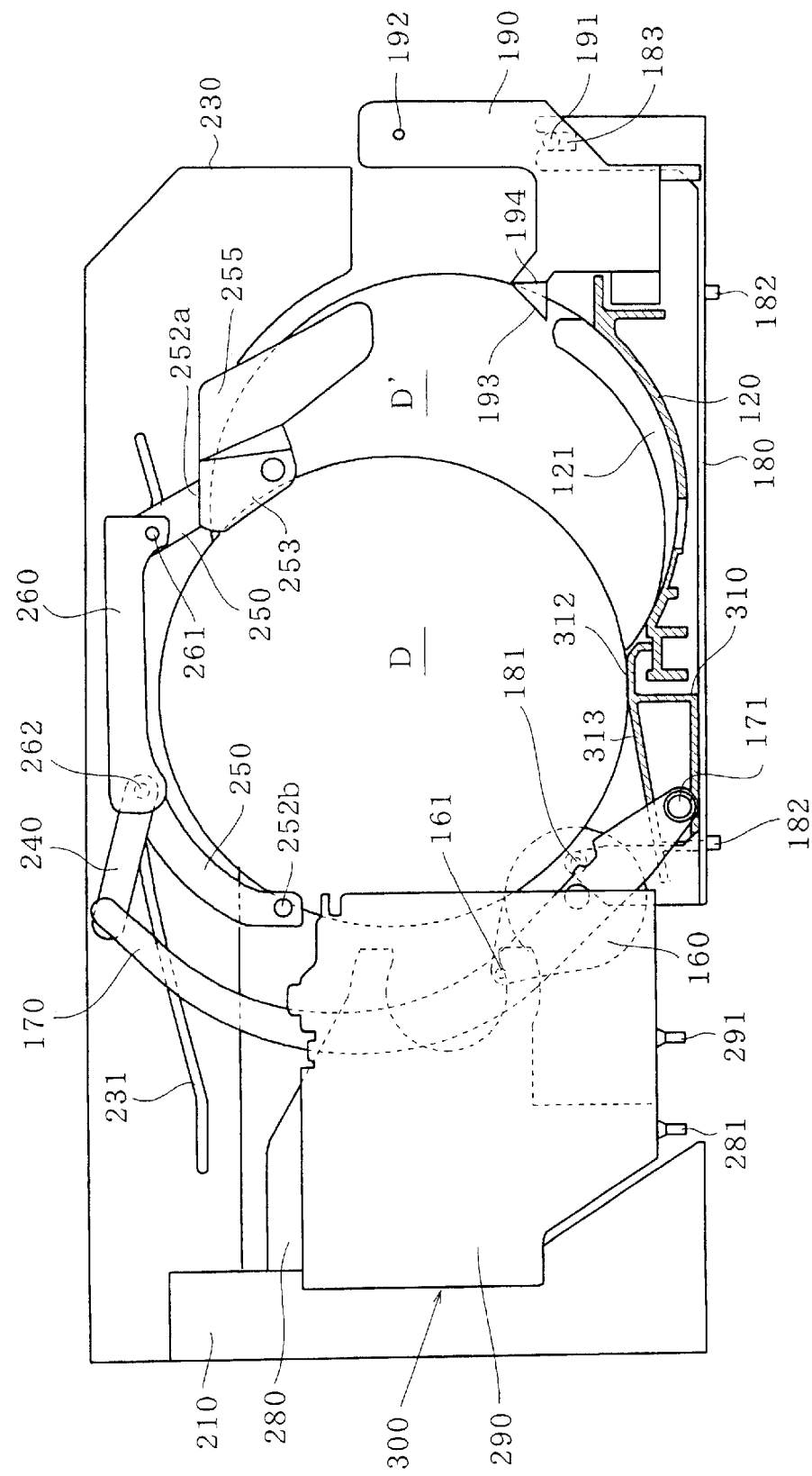

The driving cam 160 is also reversely rotated, so that the pin 161 of the cam moves to the straight portion 172b of the cam groove 172 (FIG. 22e). Accordingly, the carrying arm 250 is lowered, and the engaging portions 252a and 252b engage the periphery of the disc D. The driving arm 170 is rotated in the clockwise direction as shown in FIGS. 22c and 22b, so that the disc D is removed from the reproducing device 300 and mounted on the bottom 312 of the groove 311 as shown in FIG. 14.

On the other hand, the guide portion 255 is always inserted between the discs D' as shown in FIGS. 14 to 16, 23 during also the reproducing period. Therefore, the disc D can be exactly inserted between the discs D'. In addition, the inclined portions 253 of the carrying arm 250 are inserted between the discs D' (FIG. 14) to further expand the space there-between. Thus, the insertion of the disc D is more ensured.

Figure 15:
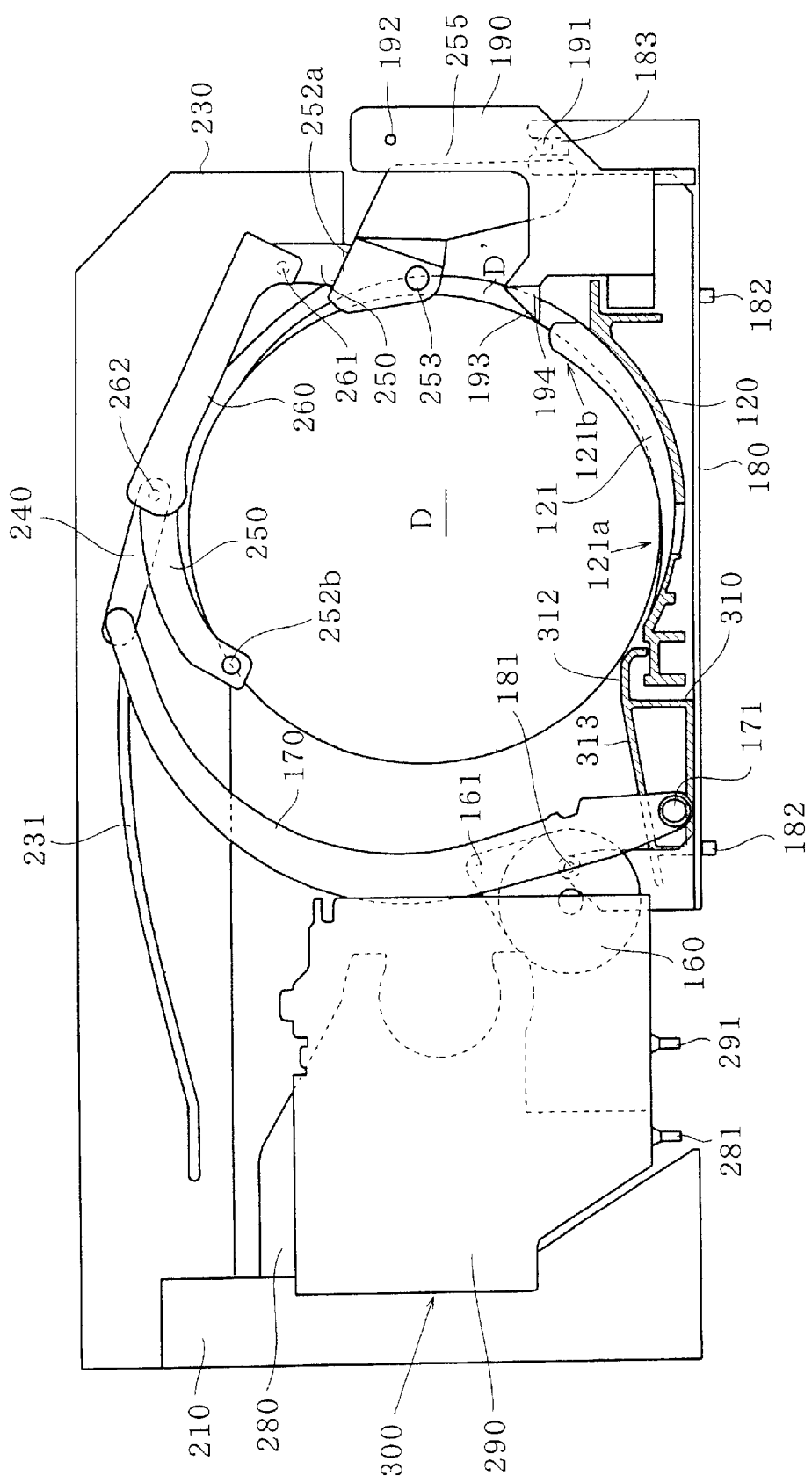

The disc D is moved toward the disc holder 120, and the guide portion 255 is inserted in the groove 195 of the pressure plate 190 (FIG. 15). Thus, the carrying arm 250 is ensurely positioned.

Figure 16:
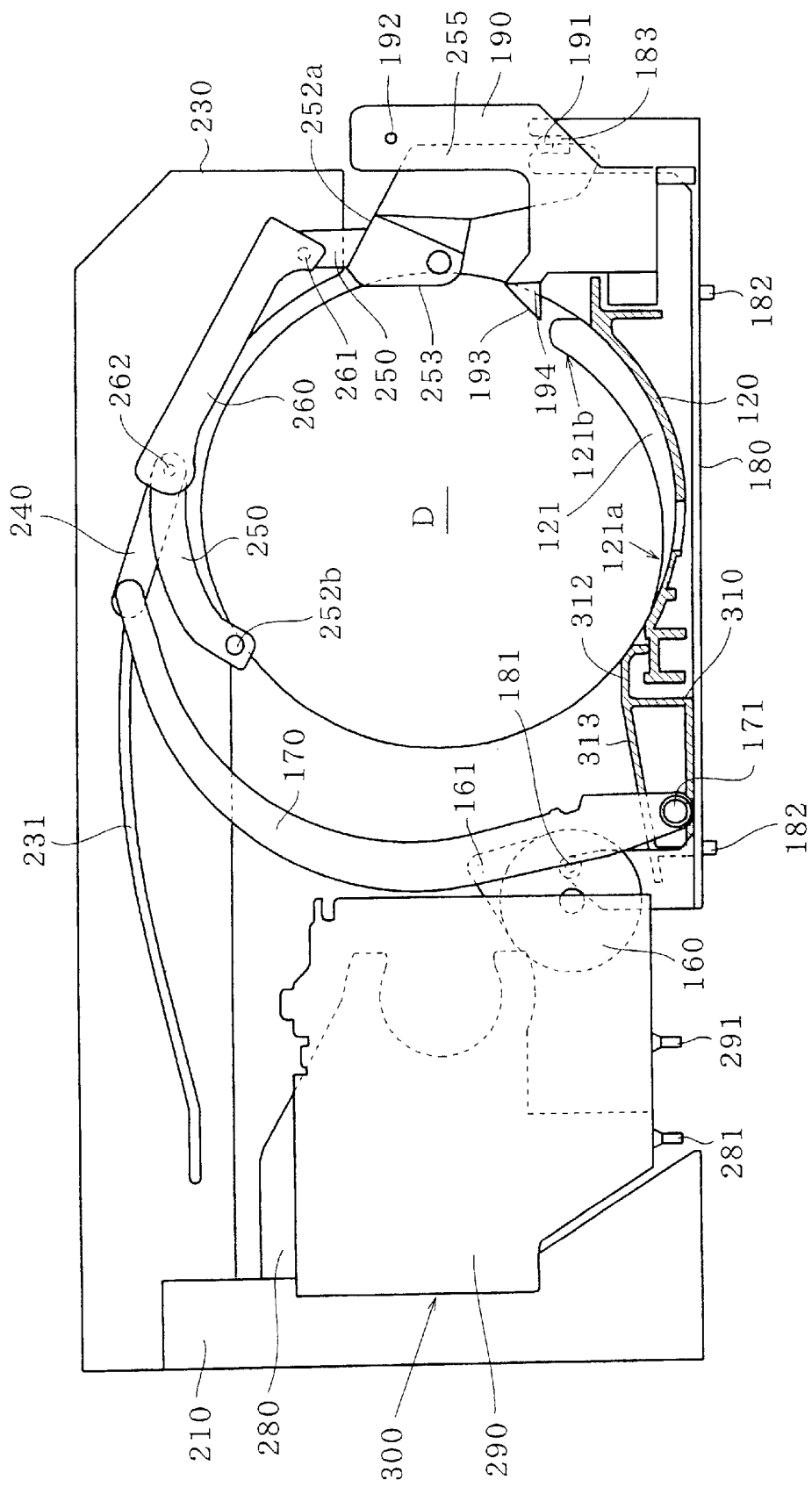

As shown in FIG. 15, the disc D is inserted in the space between the partition plates 121 from the position having the largest width 121b and the highest height at the outermost periphery of the disc holder 120. Therefore, the disc D is exactly entered in the desired space. Thereafter, the disc D is gradually inserted in the space toward the space having the smallest width 121a and the lowest height. Thus, the disc D is exactly returned to the disc holder 120 (FIG. 16).

Figure 17:
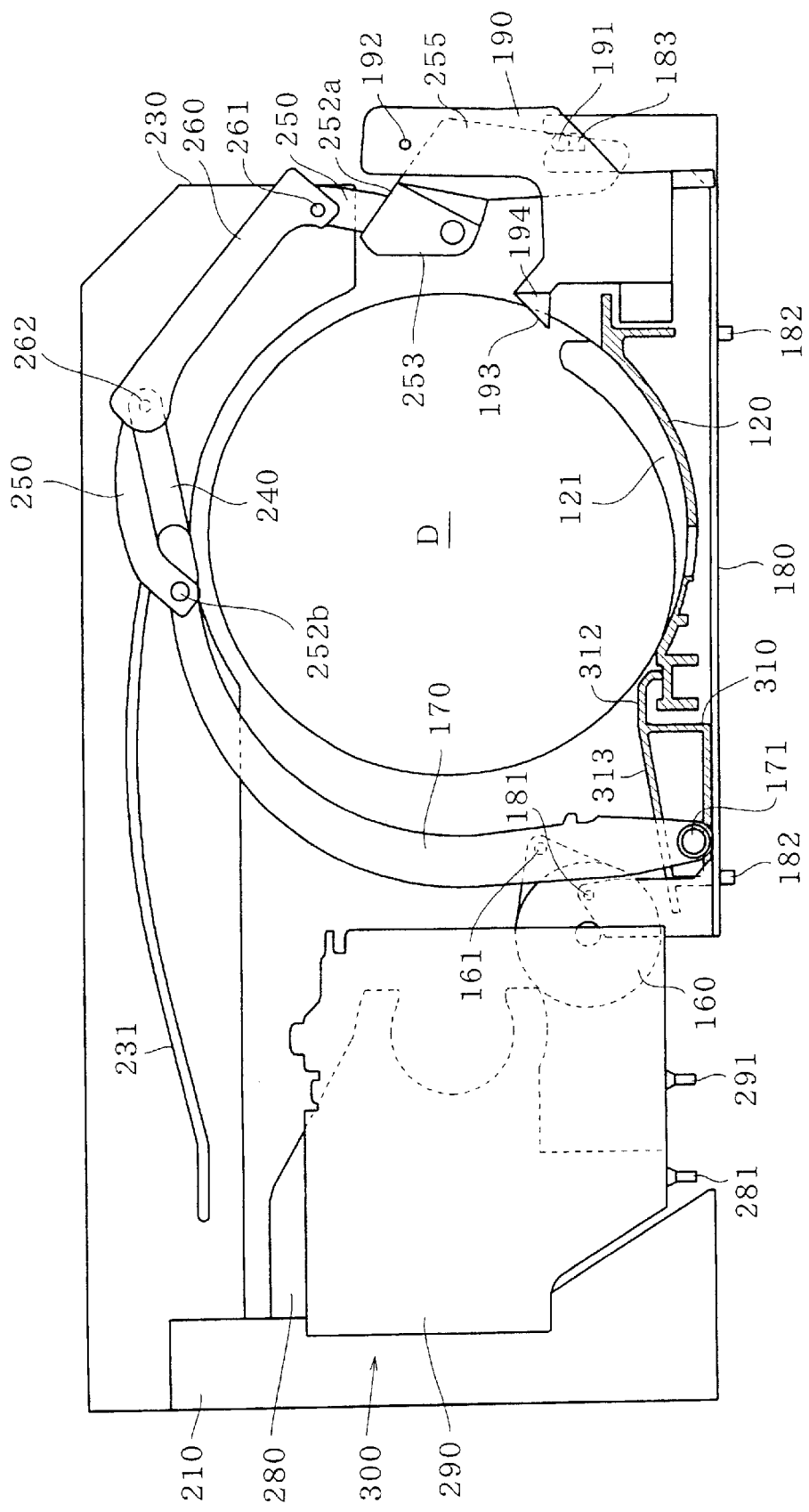

When the disc returns to the disc holder 120, the engaging portions 252a and 252b are removed from the periphery of the disc as shown is FIG. 17, and the operation of the carrying arm 250 stops.

Figure 18:
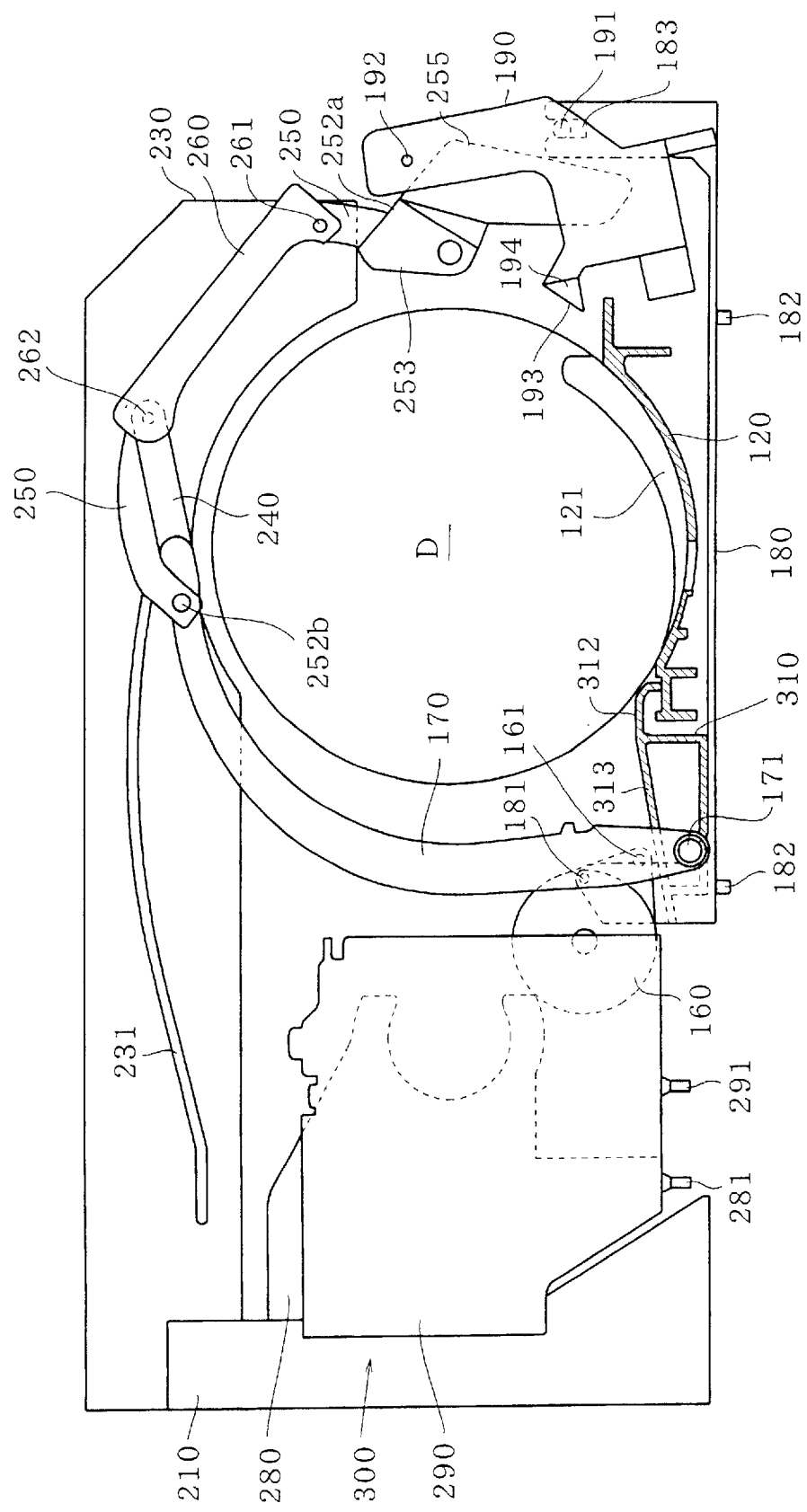
Figure 19:
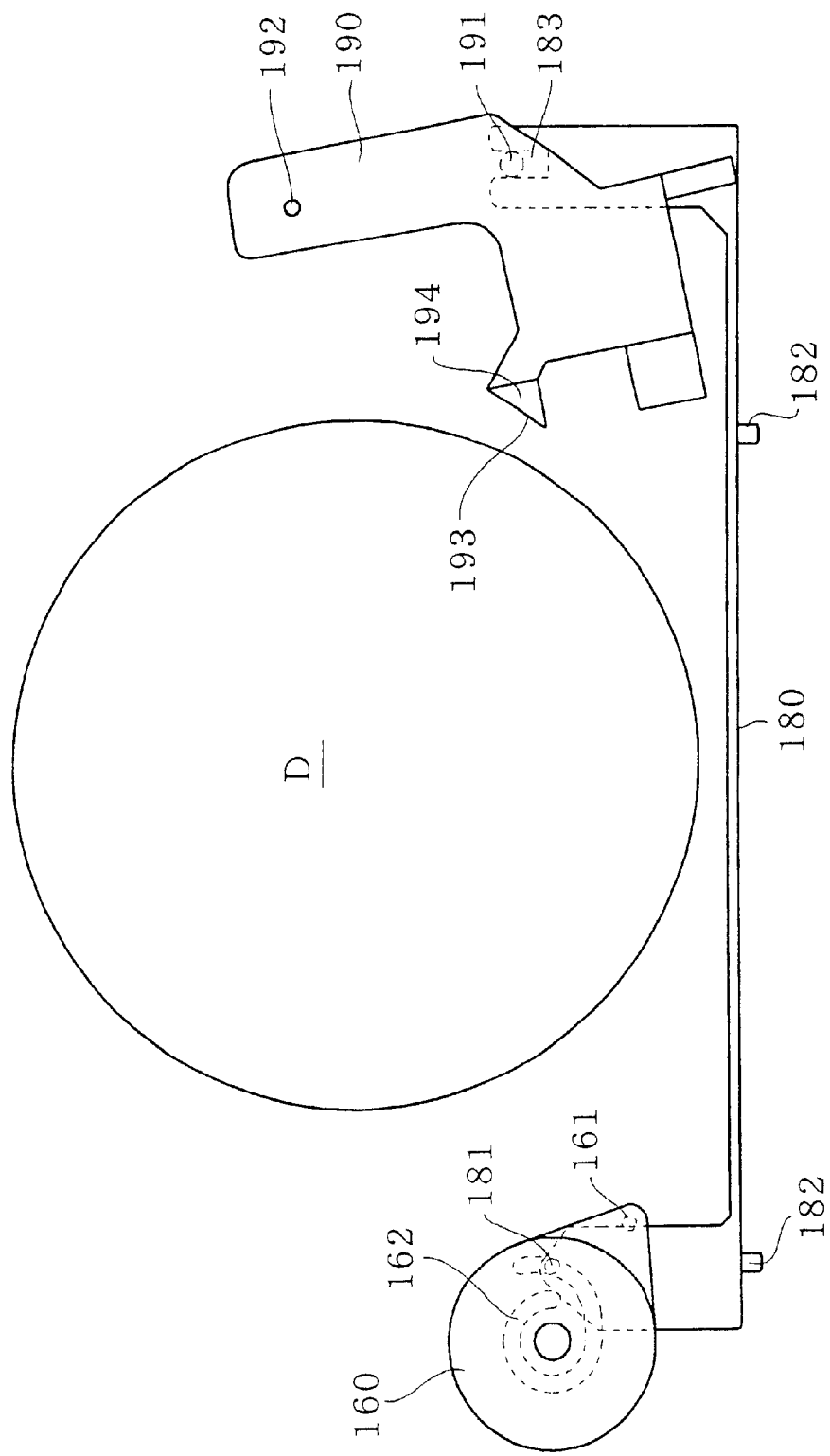

The slide plate 180 is moved to the right by the cam 160. The movement of the slide plate 180 causes the pressure plate 190 to rotate in the counterclockwise direction by the engagement of the pin 191 with the groove 183, so that the pressure plate 190 is removed from the discs D and D' and from the disc holder 120 to release the disc holder (FIG. 18). Finally motor 151 stops to complete the reproduction of the disc D.

While the invention has been described in conjunction with preferred specific embodiment thereof, it will be understood that this description is intended to illustrate and not limit the scope of the invention, which is defined by the following claims.

What is claimed is:

1. A system for reproducing a disc comprising:
a disc holder being annularly formed and having a plurality of partition plates for holding a plurality of discs in an upright position, the partition plates being radially arranged;
a reproducing device being disposed in a central portion of the disc holder for reproducing a desired disc, the desired disc being completely drawn out of the disc holder; and
carrying means for carrying the desired disc between the disc holder and the reproducing device,
wherein the carrying means has a guide portion inserted in a space between discs at opposite sides of the desired disc during a reproduction so that the desired disc can be exactly inserted in the space when the desired disc is returned.

2. A system for reproducing a disc comprising:
a disc holder being annularly formed and having a plurality of partition plates for holding a plurality of discs in an upright position;

a reproducing device for reproducing a desired disc and being disposed in a central portion of the disc holder; and carrying means for carrying the desired disc between the disc holder and the reproducing device, wherein the partition plates are radially arranged in nonparallel, so that a space between opposite partition plates has a large width portion and a small width portion, and the carrying means is provided for returning the desired disc to the disc holder from the large width portion, wherein the space between opposite partition plates gradually increases in width from an inner end to an outer end of the disc holder, and wherein a shape of an upper surface of the disc holder is a circular arc and the partition plates have a lowest height from the upper surface at the inner end and a highest height at the outer end of the disc holder.

3. A system for reproducing a disc comprising:
a disc holder being annularly formed and having a plurality of partition plates for holding a plurality of discs in an upright position;

a reproducing device for reproducing a desired disc and being disposed in a central portion of the disc holder; and carrying means for carrying the desired disc between the disc holder and the reproducing device, wherein the partition plates are radially arranged in nonparallel, so that a space between opposite partition plates has a large width portion and a small width portion, and the carrying means is provided for returning the desired disc to the disc holder from the large width portion, wherein the space between opposite partition plates gradually increases in width from an inner end to an outer end of the disc holder, wherein a shape of an upper surface of the disc holder is a circular arc and the partition plates have a lowest height from the upper surface at the inner end and a highest height at the outer end of the disc holder and wherein the disc is returned to the disc holder and inserted into the space between the partition plates from a position having the highest height of the partition plates.

4. A system for reproducing a disc comprising:
a disc holder being annulary formed and having a plurality of partition plate for holding a plurality of disc in an upright position, the partition plates being radially arranged;

a reproducing device being disposed in a central portion of the disc holder for reproducing a desired disc, the desired disc being completely drawn out of the disc holder; and a carrier for carrying the desired disc between the disc holder and the reproducing device;

wherein the carrier has a guide portion inserted in a space between discs at opposite sides of the desired disc during a reproduction so that the desired disc can be exactly inserted in the space when the desired disc is returned.

* * * * *